INVENTOR.
VIRGIL R. CARPENTER
BY
Dugger Peterson Johnson & Westman
ATTORNEYS

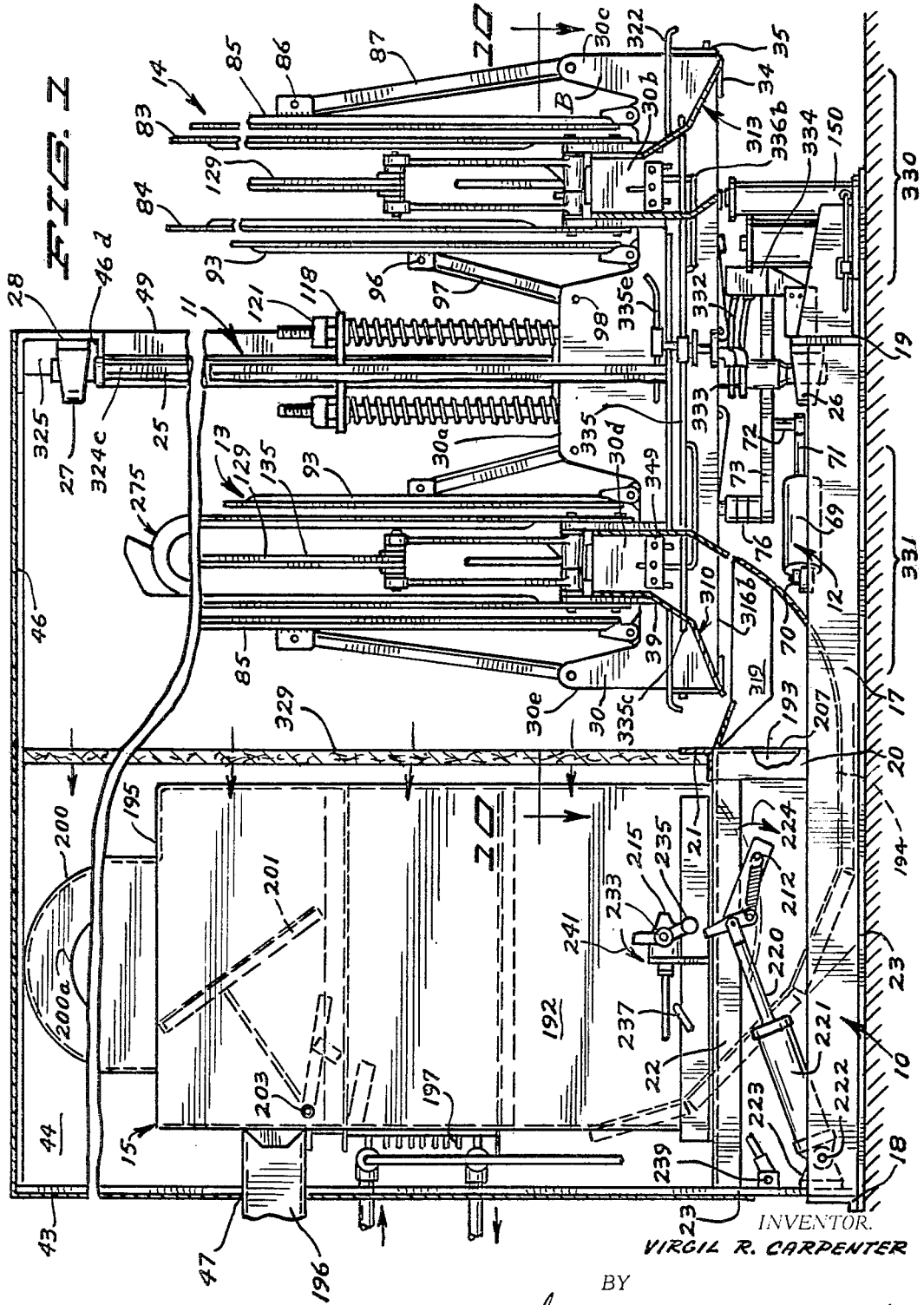

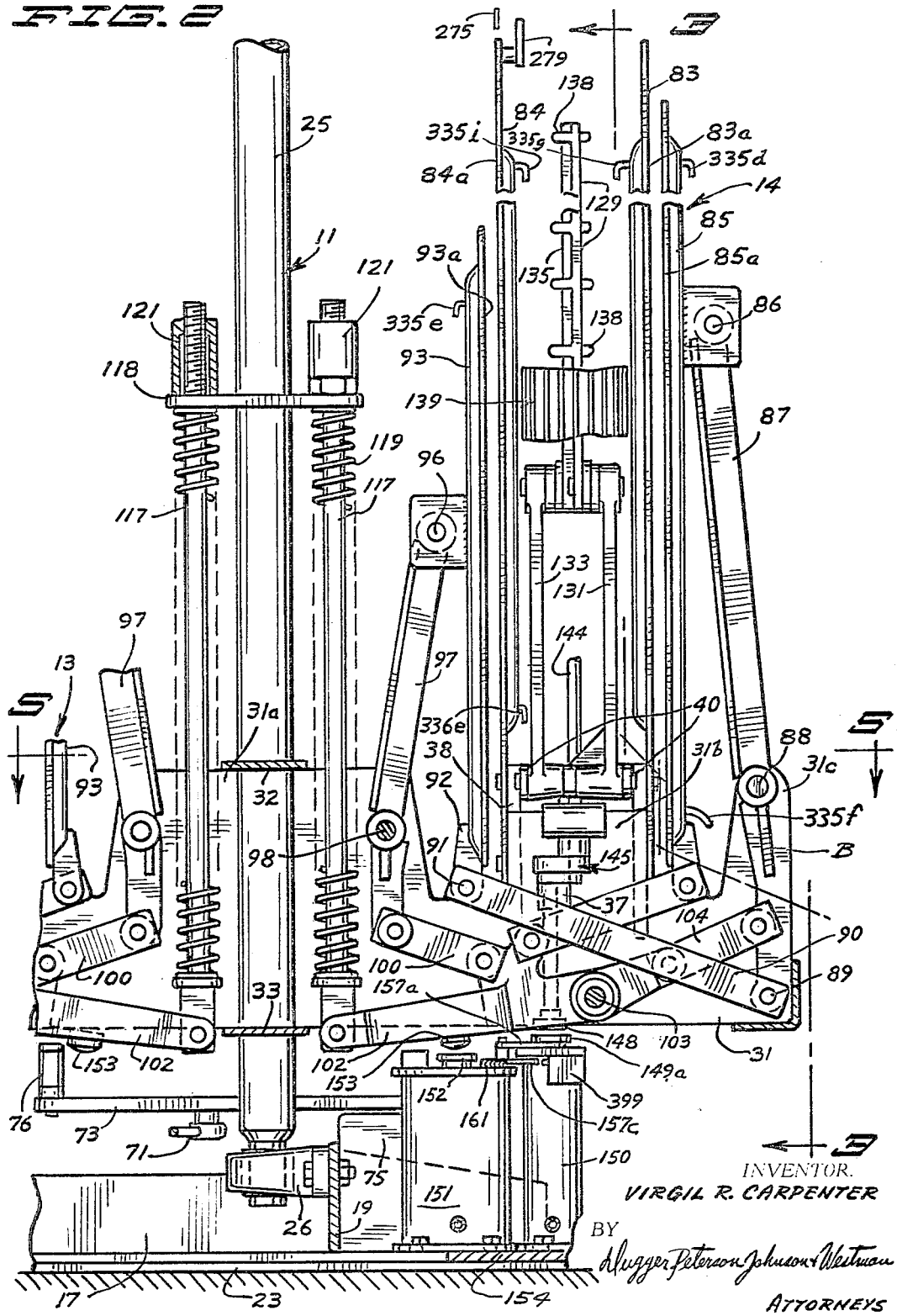

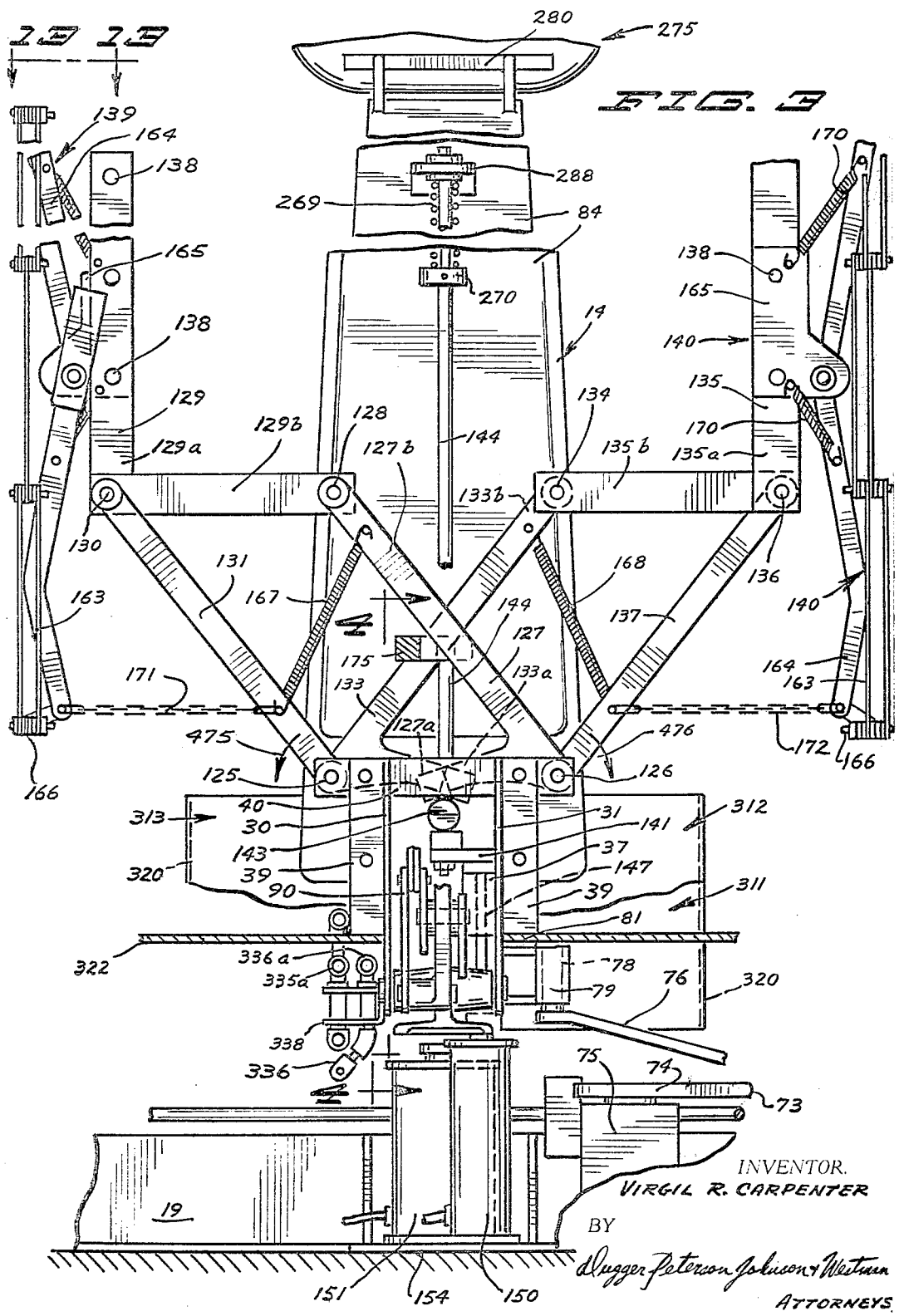

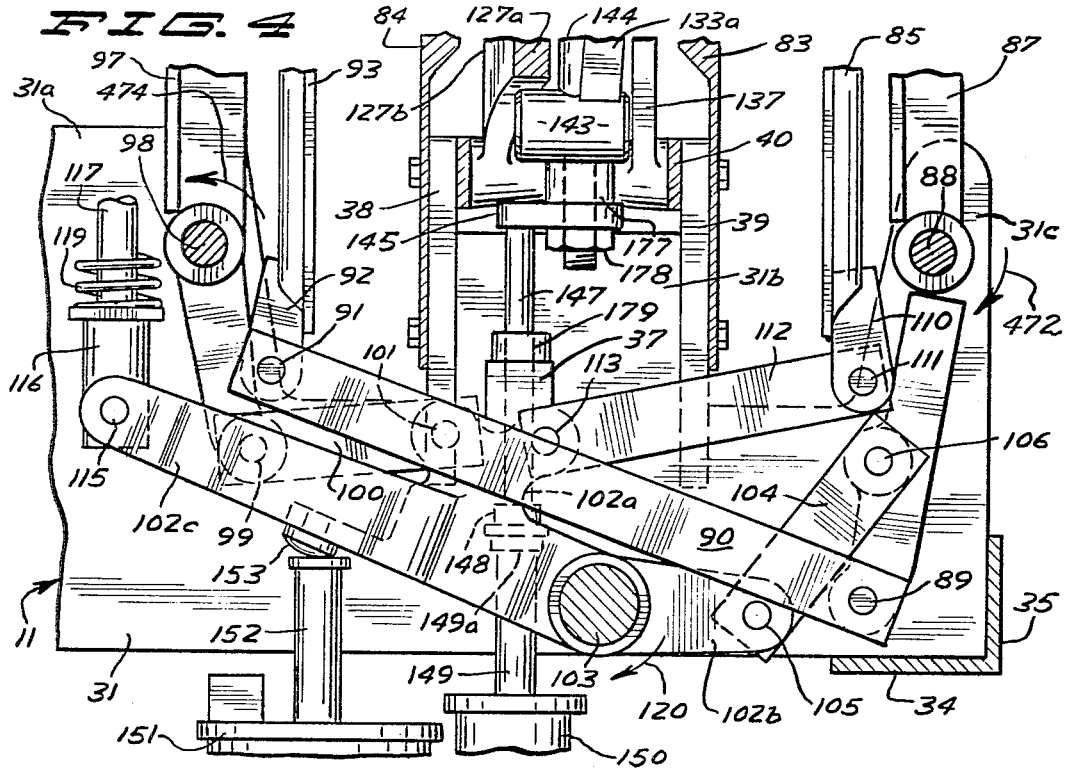
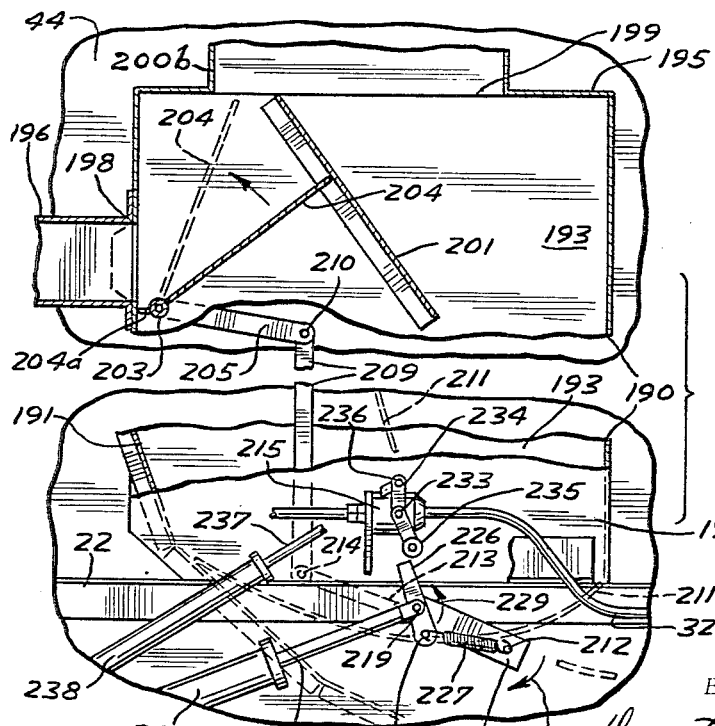

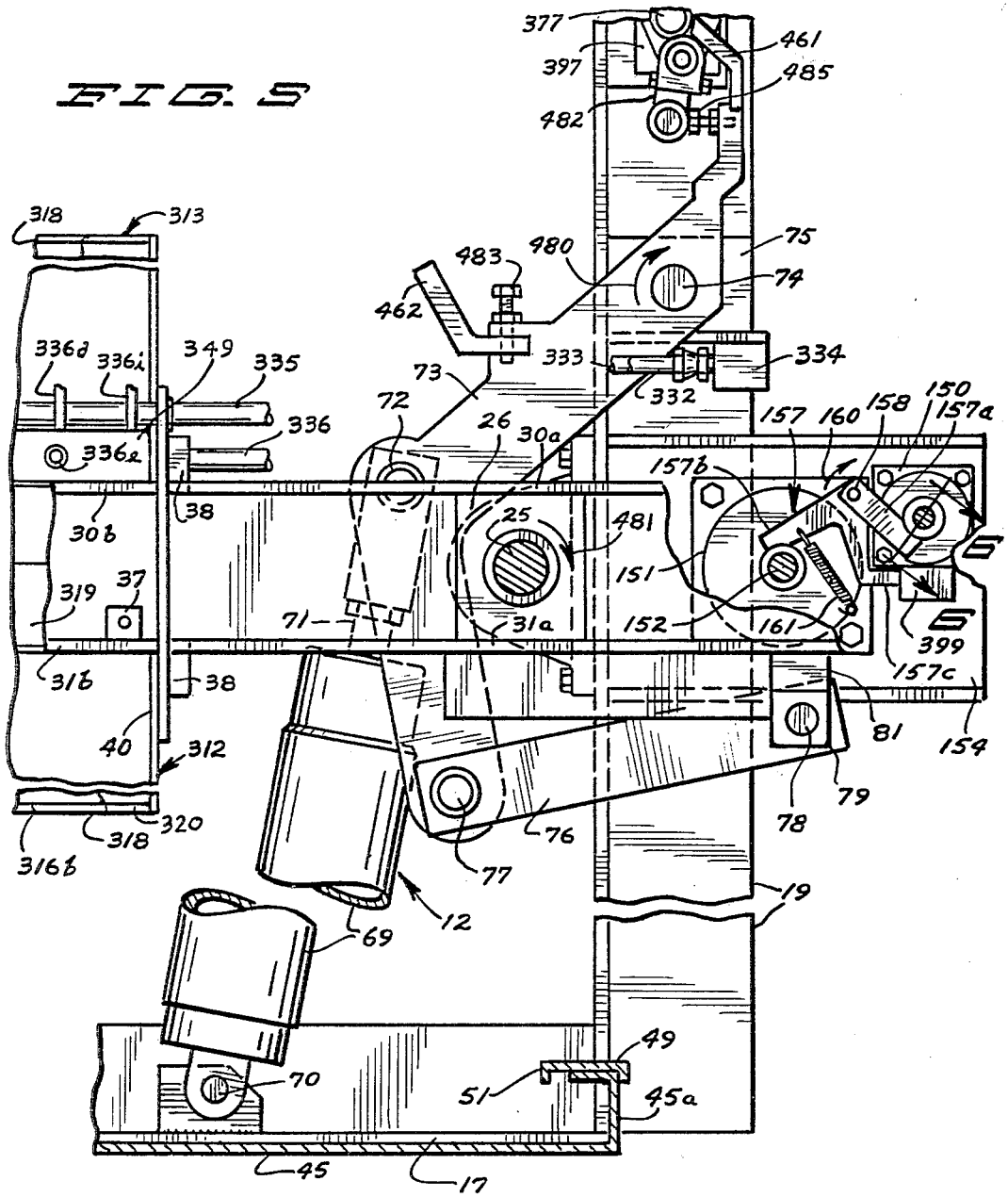

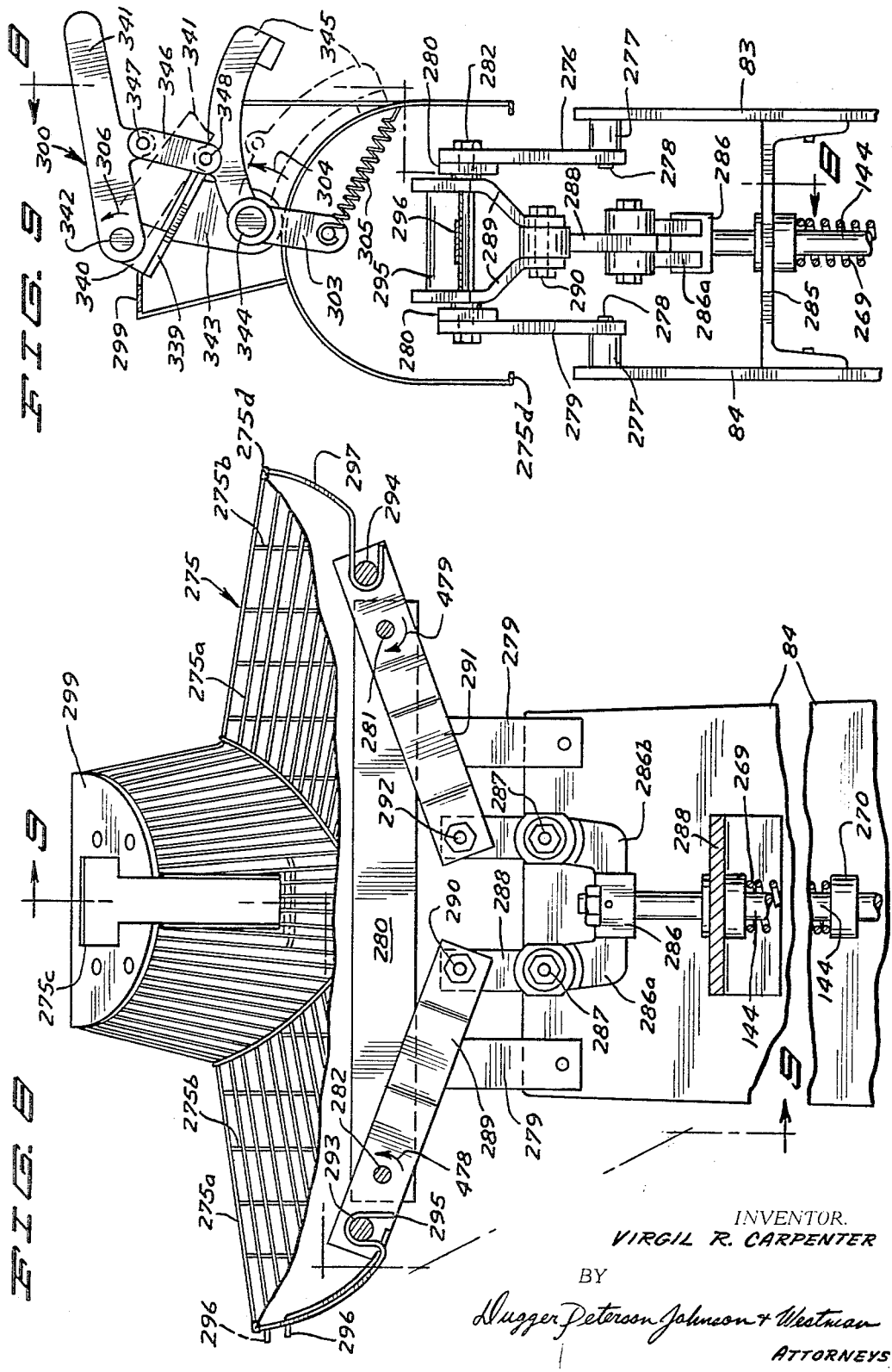

INVENTOR.
VIRGIL R. CARPENTER
BY
Dugger Peterson Johnson & Westman
ATTORNEYS

United States Patent Office 3,473,708
Patented Oct. 21, 1969

1

3,473,708
DOUBLE BUCK GARMENT DRYING APPARATUS
Virgil R. Carpenter, Roseville, Minn., assignor to The Unipress Company, Incorporated, Minneapolis, Minn., a corporation of Minnesota
Filed Mar. 15, 1968, Ser. No. 713,428
Int. Cl. D06c *15/00*
U.S. Cl. 223—57                              45 Claims

ABSTRACT OF THE DISCLOSURE

A garment drier having a buck base mounting a pair of buck assemblies, one to be transferred into an enclosure to be dried while the other is transferred to a dressing station outside of the enclosure. Piston cylinder combinations mounted at the dressing station are operable to through linkages of the buck assembly at the dressing station for moving the buck wings to a retracted position, the collar-shoulder form assembly to a lowered position and the moveable buck heads away from the buck heads that are stationarily mounted on the buck base. A blower-housing assembly and ducts within the enclosure discharge hot fluid upwardly into the garment on the buck assembly in the enclosure. Controls prevent the transfer of the buck base while fluid is being discharged toward the garment on the buck assembly in the enclosure.

CROSS-REFERENCE TO OTHER APPLICATIONS

The wing structure illustrated in this application is described in greater detail in my copending application Ser. No. 713,495 entitled "Garment Buck Apparatus" which has been filed the same day as this application and assigned to same assignee.

BACKGROUND OF THE INVENTION

A drier for garments such as coats, shirts etc. has a pair of spaced buck assemblies with one being transferred to a drying station while the other is transferred to a dressing station.

Frequently it is not necessary to press garments such as coats and shirts because of the use to be made thereof, or because the garments are of the permanent press type; but it is desirable that the garment be dried in a manner to prevent the forming of wrinkles. With garment finishers such as disclosed in U.S. Patent 2,805,009 to Jackson, either two or more machines have to be provided or else the operator has considerable idle time during the steam dry cycle. If two or more machines were to be provided, there is a larger capital investment per operator. Also with finishers such as those of Jackson, the hot air and steam are discharged to the ambient atmosphere where the operator is working. In order to overcome the above mentioned problems as well as others, this invention has been made.

SUMMARY

A drier for garments such as coats, shirts etc. having a rotatably buck base mounting a pair of buck assemblies to position one at a drying station, and the other remote of the drying station to have a dried garment removed therefrom and another garment dressed thereon, a power operated transfer assembly for rotating the buck base, and a blower-housing assembly and ducts for discharging hot air, and preferably for a short period steam, into the garment at the drying station. Preferably the blower-housing assembly as well as the buck assembly at the drying station are located in a substantially enclosed chamber.

One of the objects of this invention is to provide new

2 and novel apparatus for transferring one buck assembly from a loading station to a drying station while a second buck assembly is being transferred from the drying station to the loading station, and discharging hot fluid into the garment on the buck assembly at the drying station. In furtherance of the above mentioned object, it is a further object of this invention to provide a buck assembly for retaining the garment as it is being dried in a general taut condition, other than the arm portions, if any.

Another object of this invention is to provide on a buck assembly that is automatically moveable between a dressing station and a drying station, new and novel mechanical linkage means for moving the buck wings between an extended position and a retracted position, lowering a shoulder-collar form assembly and moving a pair of buck heads relative a second pair of heads located intermediate thereof between a garment clamping condition and a retracted condition. Still another object of this invention is to provide in a drier for garments such as shirts, coats and the like, new and novel apparatus for directing a hot fluid into a garment dressed on the buck assembly while the buck assembly is in an enclosure and moving the buck assembly outside of the enclosure after the garment is dried.

BRIEF DESCRIPTION OF THE DRAWINGS

FIGURE 1 is a side elevational view of the apparatus of this invention with a vertically immediate portion thereof, the paneling on one side and other parts broken away, the buck mechanism rotated 180° from a datum position, and the buck assemblies in a buck closed, wing expanded condition; also the adjacent side walls of the ducts are not shown;

FIGURE 2 is an enlarged fragmentary view of a part of the buck mechanism illustrated in FIGURE 1 in the position of FIGURE 1 with one buck base frame plate not being shown;

FIGURE 3 is a front view of part of the structure illustrated in FIGURE 2, said view being generally taken along the line and in the direction of the arrows 3—3 of FIGURE 2;

FIGURE 4 is an enlarged view generally taken along the line and in the direction of the arrows 4—4 of FIGURE 3 of a portion of the structure of FIGURE 2 other than that the buck head and wing operating linkages are illustrated in a buck open-wings retracted condition, and the shoulder-collar form assembly operating mechanism is in a shoulder-collar form lowered position;

FIGURE 5 is a fragmentary horizontal view of the buck mounting and buck transfer assemblies with various portions broken away, said view being generally taken along the line and direction of the arrows 5—5 of FIGURE 2 other than that the buck heads and the operating linkages mounted on the buck base are not illustrated and the buck base and transfer mechanism are shown in a datum position;

FIGURE 6 is a fragmentary cross-sectional view generally taken along the line and in the direction of arrows 6—6 on FIGURE 5 to show the cam surface of the collar-shoulder form piston rod and part of the buck control switch arm operated by it;

FIGURE 7 is an enlarged fragmentary view of the blower-housing assembly with portions of the blower and housing being broken away to illustrate the dampers and damper operating linkage, the upper damper being shown in solid lines in the closed position and in dotted lines in the open position while the lower damper is shown in a closed position in dotted lines and only a portion of the lower damper is shown in an open position in dotted lines;

FIGURE 8 is a vertical view generally taken along the line and in the direction of arrows 8—8 of FIGURE 9 to illustrate the mounting of the collar-shoulder form assembly on buck heads and the mechanism for moving said assembly relative said heads;

FIGURE 9 is a fragmentary vertical view of the buck assembly in a shoulder-collar form raised condition, said view being generally taken along the line and in the direction of arrows 9—9 of FIGURE 8 and also showing the collar clamp assembly in a closed position in dotted lines and an open position in solid lines;

FIGURE 4 is a simplified schematic of the pneumatic and electrical circuits and components for the apparatus of this invention.

Referring now to FIGURE 1 there is illustrated the garment dryer of this inevntion which includes a frame 10, a buck mounting assembly 11, a buck transfer assembly 12, a first buck assembly 13, a second buck assembly 14, and a blower-housing assembly 15, each of the aforementioned being generally designated. The frame includes a pair of bottom, longitudinally elongated parallel channels 17 that are connected together at the rear by a transverse frame member 18 and at the front by a transverse angle iron 19, members 17, 18 and 19 being mounted on a base plate 23 that extends therebeneath. To each of the longitudinal frame members 17 at a location intermediate frame members 18 and 19, there are secured transversely spaced, upright angle irons 20 which on their upper ends mount a transverse angle iron 21. Intermediate the opposite ends of frame members 21 and attached thereto are the one ends of a pair of spaced, longitudinally extending frame members 22, the opposite ends of frame members 22 being respectively joined to upper ends of vertical plates 23. The lower ends of plates 23 are mounted by the rear transverse frame member 18.

Figure 10:
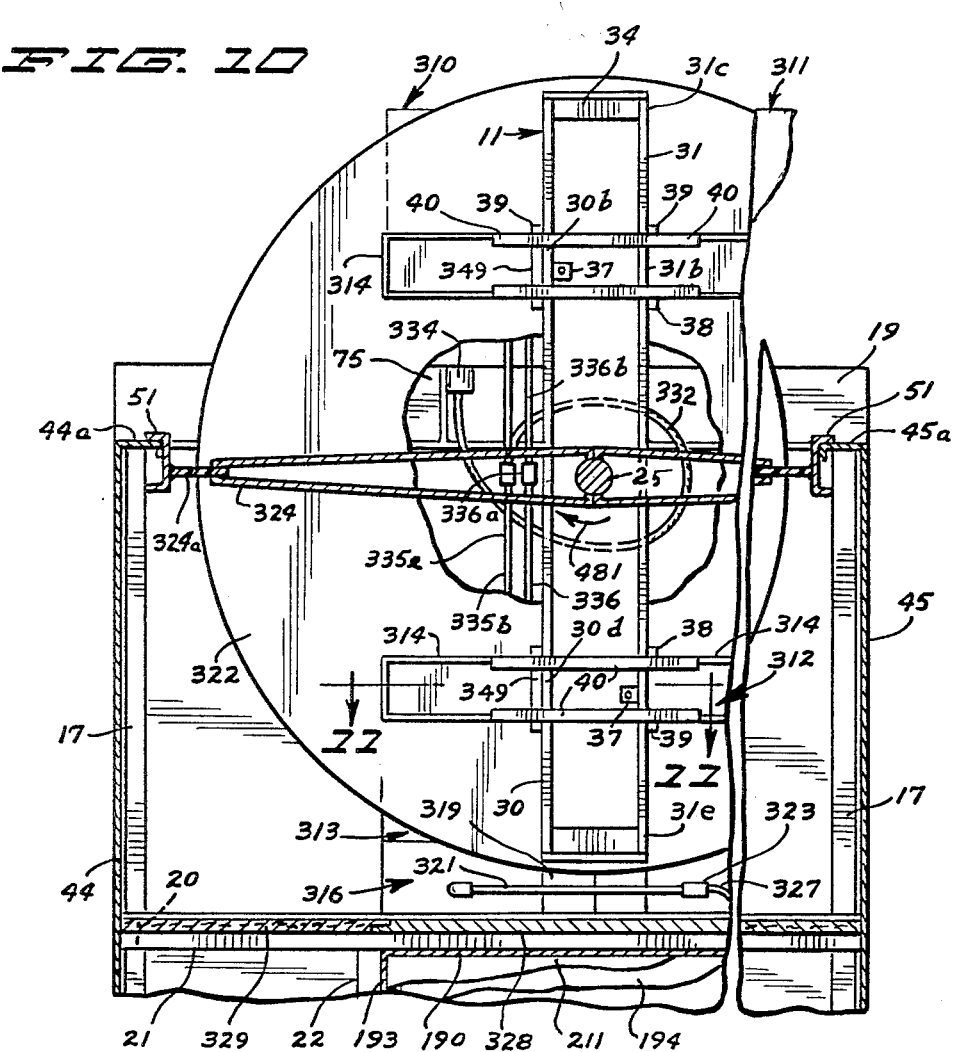
FIGURE 10 is a fragmentary horizonal cross sectional view generally taken along the line and in the direction of the arrows 10—10 of FIGURE 1 other than for the buck frame being in a datum position and the buck assemblies not being illustrated.
Figure 11:
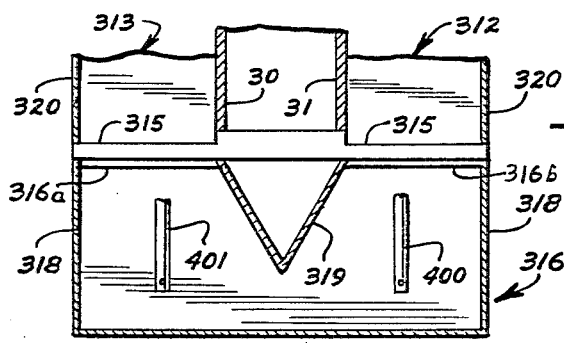
FIGURE 11 is a fragmentary transverse cross sectional view generally taken along the line and in the direction of the arrows 11—11 of FIGURE 10.

Mounted by frame members 17, 17, 18, 19 respectively are a rear panel 43, a side panel 44, and an opposite side panel 45. Panels 44, 45 respectively have iron flanges 44a, 45a that extend inwardly toward one another and thence a short distance rearwardly (see FIGURES 1, 5 and 10). Flanges 44a, 45a each mount a channel member 51 to have vertical web portions extend longitudinally transversely opposite a vertical post 25. A top panel 46 is mounted by the aforementioned panels in conjunction with frame members 17–19, channels 51 and the base plate 23 on the floor on which the apparatus of this invention is mounted to form a cabinet having a chamber that is enclosed other than for a front opening 49 in part defined by channels 51, an opening 47 in the rear panel and openings (not shown) for electrical, air and fluid conducts. The panels have a layer of insulation (not shown).

The buck mounting assembly 11 includes the vertical post 25 that has its lower end rotatably mounted by a bearing member 26 which in turn is mounted on frame member 19; and an upper end rotatably mounted by bearing member 27 which in turn is mounted on the top frame member 28 that is vertically above frame member 19 and mounted by the top panel. The post 25 is transversely centrally located relative the longitudinal frame members 17 and a short distance rearwardly of frame member 19.

Mounted on the post to rotate therewith is a buck base B that includes parallel, horizontally elongated, parallel vertical plates 30, 31 (see FIGURES 1–3). A top plate 32 and a bottom plate 33 are welded to the post 25 to mount plates 30, 31 on diametrically opposite sides thereof and spaced therefrom. The lower corner portions of plates 30, 31 at either end are connected together by horizontal plate 34 and a vertical plate 35. The plates 30, 31 have curved upwardly extending central portions 30a, 31a, upwardly extending intermediate portions 30b, 31b and 30d, 31d respectively equally horizontally spaced from the central portions, and upwardly extending end portions 30c, 31c and 30e, 31e respectively equally horizontally spaced from the respective intermediate portion.

The buck base on either side of the post includes an upright 38 joined to the one edge portion of each of buck base intermediate portion 30d, 31d, 30b, 31b, and uprights 39 joined to the opposite edges of said buck base intermediate portion to be located further outwardly from the post than uprights 38. Mounted by each pair of uprights 38 on the same side of the post is a transverse bar 40 to extend outwardly of plates 30, 31 at right angles thereto while each adjacent pair of uprights 39 likewise mount a transverse bar 40 (also see FIGURE 10). Plate 30 mounts a bracket member 37 intermediate uprights 38, 39 and vertically above its lower edge while a corresponding bracket is mounted by plate 31 in a corresponding location relative post 25 and on the opposite side thereof.

In order to rotate the buck base and the structure thereon 180° in one angular direction from the position illustrated in FIGURE 1 to the datum position of FIGURES 5 and 10, and then in the opposite angular direction from the datum position to the position illustrated in FIGURE 1, there is provided the buck transfer assembly 12 (see FIGURES 1 and 5). Buck transfer assembly 12 includes a piston cylinder combination having a cylinder 69 pivotally connected at 70 to one frame member 17 rearwardly of frame member 19 and a piston rod 71 pivotally secured to a rod 72 that is dependingly attached to an intermediate portion of the control arm 73. The control arm has one end portion keyed to a vertically extending pivot member 74 which in turn is pivotally mounted by a block 75 that is attached to frame member 19 on the transverse opposite side of post 25 from the frame member 17 to which cylinder 70 is pivotally connected. The opposite end of the control arm is pivotally connected to one end of the link arm 76 by a pivot member 77, the opposite end of the link arm mounting an upright shaft 78 which in turn is pivotally mounted by a block 79 secured to a channel 81. Channel 81 is mounted on plate 31 at a location horizontally intermediate plate portions 31a, 31d.

Since the buck assemblies are the same construction except that they are located at diametric opposite sides of post 25, and the parts of assembly 13 will be in the same relative position when rotated to the position of assembly 14, only the second buck assembly 14 will be described in detail. The second buck assembly 14 includes a vertically elongated stationary buck head 83 that has a lower end portion bolted to uprights 39 to extend transversely across plates 30, 31. A rear stationary buck head 84 is bolted to uprights 38 on the opposite side thereof from head 83 to extend generally parallel to head 83. On the opposite side of head 83 from head 84 and more adjacent to head 83 is a buck head (clamp head) 85 that is in part mounted for movement by having an intermediate portion thereof pivotally connected to the upper end of an arm 87 by a pivot member 86. The lower intermediate portion of arm 87 is pivotally mounted on the horizontal pivot member 88 that in turn has its opposite ends mounted by brick base portions 30c, 31c. The lower end of arm 87 is pivotally connected by a pivot member 89 to one end of elongated link arm 90. The link arm extends beneath cross bars 40 and has an opposite end pivotally connected at 91 to a bracket 92 that is welded to the lower end of the rear movable buck head 93 at a location generally between buck base frame portions 30a, 31a. An intermediate portion of the rear buck head (clamp head) 93 is pivotally connected by pivot member 96 to the upper end of an arm 97, the intermediate portion of arm 97 being pivotally mounted on pivot member 98 that in turn is mounted by buck base portions 30a, 31a at a location between post 25 and cross bars 40. As a result, buck head 93 is mounted for movement from a closed position adjacent stationary head 84 and an open position more remote therefrom to be inclined upwardly and outwardly of head 84.

The lower end of arm 97 is connected by a pivot member 99 to one end of the short link arm 100, the opposite end of which is pivotally connected by a pivot member 101 to an upwardly extending protrusion 102a of a buck lever 102 at a location adjacent uprights 38 and therebetween. The buck lever has a central portion pivotally mounted by a pivot member 103 that has its opposite ends mounted by plates 30, 31 beneath plate portions 30b, 31b.

The lever has an arm portion 102b that extends radially outwardly from pivot 103 on generally the opposite side of said pivot from protrusion 102a, the outer end of arm portion 102b being pivotally connected to one end of the short link arm 104 by a pivot member 105. The opposite end of arm 104 is pivotally connected by pivot member 106 to arm 87 at a location between pivot members 88, 89.

The lower end of the movable buck head 85 has a tab 110 that is connected to one end of a link arm 112 by pivot member 111. The opposite end of arm 112 is pivotally connected to lever protrusion 102a by a pivot member 113 at a location generally between pivot members 111, 101.

Lever 102 has an arm portion 102c extending a substantial distance further outwardly of pivot 103 than protrusion 102a and generally on the opposite angular side of the pivot from arm portion 102b. The outer end of arm portion 102c is pivotally connected by pivot member 115 to a connection member 116 that is mounted on the lower end of a vertically elongated rod 117 to move therewith. The rod has an upper end portion slidably extended through an aperture in a plate 118 that is welded to post 25 a substantial distance vertically above plate 32, there being provided a coil spring 119 on the rod that has one end portion bearing against plate 118 and an opposite end portion bearing against a shoulder of member 116 for resiliently urging the rod through member 116 to pivot the lever 102 about pivot member 103 in the direction opposite arrow 120. A nut 121 is threaded on the upper end portion of rod 117 for bearing against plate 118 to limit the downward movement of the rod 117 and thereby the pivotal movement of the lever in the direction opposite arrow 120, the nut having a counterbore of a larger diameter than the rod that opens to plate 118 and a threaded portion above the counterbore. By the above described structure the movable buck heads are mounted for movement relative the stationary buck heads between a closed and an open position. The buck heads preferably have padding (not shown) on adjacent generally planar surfaces 93a, 84a and 83a, 85a respectively for abutting against the garment dressed on the buck assembly when said assembly is in a garment clamping position.

Mounted by the one end portions of the cross bars 40 is a horizontal pivot shaft 125 to extend perpendicular to the planar surface of heads 83, 84; while the opposite ends of said cross bars mount a corresponding pivot shaft 126 (see FIGURES 2 and 3). Shaft 126 pivotally mounts the one end portion of a wing control member 127 that has a radially elongated arm portion 127b, the opposite end of arm portion 127b mounting a pivot member 128 that pivotally mounts the one end of the horizontal arm 129b. Wing bracket 129 has a vertical arm portion 129a joined to the opposite end of arm portion 129b to extend thereabove, a pivot member 130 pivotally connecting the upper end of arm 131 to the wing bracket at the junction of arm portions 129a, 129b. The opposite end of arm 131 is pivotally mounted on pivot member 125. Arm portion 127b and arm 131 provide a parallel linkage for mounting wing bracket 129.

A second control member 133 is of the same construction as control member 127, but oppositely faced; and has one end of its elongated arm portion 133b mounted on pivot shaft 125 and an opposite end pivotally connected by pivot member 134 to the horizontal arm portion 135b of wing bracket 135. The wing bracket 135 also has an upright arm portion 135a that is joined to arm portion 135b, a pivot member 136 being extended through portions 135a, 135b and mounted by the upper end of arm 137. The opposite end of arm 137 is pivotally mounted on pivot 126 whereby arm portion 133b and arm 137 provide a parallel linkage for mounting wing bracket 135. Members 133, 137 are mounted on shafts 125, 126 adjacent buck head 84 while members 131, 127 are mounted on the shaft adjacent buck head 83. Further, the wing brackets are mounted by the respective sets of parallel linkage arms to have the horizontal legs 129b, 135b on the adjacent sides of the arms and the vertical legs 127a, 137a more closely adjacent to one another in the direction of elongation of the base plate than the horizontal legs 129b, 135b.

Each arm 129b, 135b has a plurality of vertically spaced horizontal studs 138 for mounting vertically elongated wings 139, 140 respectively to extend outwardly of the vertical wing arms in opposite directions and be oppositely faced. The wings have a maximum width that is slightly less than the minimum spacing between bucks 83, 84; have vertically elongated, circumferentially spaced, flexible rods (wires) 163 that in cross section encompass about one-half a circle; rod mounting mechanism 166 for each ends of the rods; a member 164 having one end of an elongated rigid arm pivotally connected to one mechanism 166 and an opposite end pivotally connected to a short link that in turn is pivotally connected to the other mechanism 166, and a bracket 165 pivotally connected to about the midportion of the linkage arm, said brackets 165 having a pair of spaced apertures to have vertically adjacent studs on the respective vertical wing arm extended therethrough. Springs 170 are connected to the member 164 and the adjacent wing bracket to resiliently retain the wing in a generally vertical condition. A chain 171 connects the lower end of the linkage arm of member 164 to the lower end of arm 131 for one wing while a chain 172 likewise connects the lower end of the other linkage arm to arm 137. Chains 171, 172 limit the outward movement of wings relative the buck heads to prevent the wings abutting against channels 51 as the buck base is rotated.

The wings are of vertical lengths to extend from about vertical intermediate the seam of juncture of the arm of the garment to the lower end of the garment while the brackets are located about vertically intermediate the vertically opposite ends of the garment to minimize the chance of the wings being inclined relative one another in a manner that both the upper and lower portions of the garment are not retained in a taut condition when the wings are in an expanded condition. No covering is provided over the rods to prevent the free flow of fluid between the rods to be discharged through the portion of the garment adjacent thereto. Since the wings are preferably of the construction of the wings described in my aforementioned copending application, they will not be further described in this application.

A coil spring 167 is connected between the upper end portion of arm 127b and the lower end portion of arm 131 for resiliently urging linkages 127, 131 to move wing bracket 129 and thereby wing 139 to the expanded position of FIGURE 3. Likewise a coil spring 168 is connected between the upper end of arm 133b and the lower end portion of arm 137 to resiliently urge wing bracket 135 to move wing 140 to the expanded position of FIGURE 3.

In order to move the wings between the fully extended position of FIGURE 3 and a retracted position that the vertical arms 129a, 135a are substantially closer to one another and generally vertically above pivots 125, 126 respectively, the control members 127, 133 respectively have arm portions 127a, 133a extending into overlaying relationship to the horizontal cam rod 143 on opposite sides of the vertically elongated rod 144.

Rod 144 is extended through and attached to rod 143 to extend perpendicular thereto and to move therewith. Further rod 144 is located intermediate the path of movement of the sets of wings parallel linkages and extends between and closely adjacent the wing bracket horizontal arms when the wings are in a retracted position. Rod 144 slideably extends through a bearing mounted in one leg of a somewhat L-shaped bracket 175, the other leg being mounted on head 84. Bracket 175 is of a size and shape and located so as not to interfere with the movement of the arms 131, 127b, 133b, 137 between a wing extended and a wing retracted position. The lower end of rod 144 extends through a spacer 177, thence through an aperture in plate 145 and has a nut 178 threaded thereon and keyed thereto. The spacer forms a loose fit with the rod and is located between plate 145 and rod 143. Plate 145 is fixedly attached to the upper end of a rod 147 that is slideably extended through an annular abutment 179 and bracket 37. Plate 145 in abutting against abutment 179 which in turn abuts against bracket 37 limits the downward movement of rods 144, 147. The spacer and abutment ring provide an adjustment feature for the horizontal movement of the wings and the structure moved by rod 144. Rod 147 extends downwardly between plate 31 and the buck lever, the lower end of said rod mounting an abutment member 148.

When the second buck is in a buck closed, garment dressing position, the abutment 148 is located directly above cap 149a on the upper end of the piston rod 149 of the piston cylinder combination 149, 150. The cylinder of the aforementioned combination is bolted to a bracket 154 that is secured to the central portion of frame member 19 to extend forwardly thereof. As may be noted from FIGURES 1–3, when the piston rod 149 is in a retracted position, the upper surface thereof is at a lower elevation than the buck base.

Mounted on frame member 19 and bracket 154 longitudinally intermediate said frame member and cylinder 150 is a piston cylinder combination having a cylinder 151 and a piston rod 152 that is located directly vertically beneath a button 153 when the second buck is in a garment dressing position. The button 153 is secured to arm portion 102c longitudinally intermediate pivots 103, 115 whereby when air under pressure is applied to cylinder 151, the piston rod is elevated to force lever 102 to pivot about pivot member 103 in the direction of arrow 120 as will be described in further detail hereinafter.

A control member 157 is mounted for pivotal movement about a vertical axis on cylinder 151 by a pivot member 158, said member 157 having an arm portion 157a extending radially outwardly of pivot 158 to have a remote edge portion bear against the frusto-conical cam surface 149b of piston rod 149 when the piston rod is in its fully retracted or nearly fully retracted position. Cam surface 149b is tapered such that when the piston rod is fully retracted, the arm portion 157a extends partially beneath cap 149a, and as the piston rod is moved to its extended position, control member 157 is pivoted about member 158 in the direction of arrow 160.

Control member 157 also has a second arm portion 157b extending radially outwardly of pivot member 158 to have a remote edge portion bear against a frusto-conical cam surface (not shown) of piston rod 152 in the manner described with reference to arm portion 157a and piston rod 149, and a third arm portion 157c having a terminal end to operate switch 399. A coil spring 161 is connected to the cylinder 150 and to arm portion 157b to, when piston rods 149, 152 are fully retracted, pivot the control member in the direction opposite arrow 160 to a position that switch 399 is closed. However, if either piston rod 149 or 152 is extended sufficiently high to abut against any structure mounted on the buck base to move therewith, or the buck base per se, prior to the respective piston rod being extended to such a height, the cam surface of the respective piston rod has pivoted control member against the action of spring 161 a sufficient angular amount that arm portion 157c has moved to permit switch 399 (through conventional spring mechanism—not shown) moving to an open position. Thus switch 399 is only closed when both of piston rods 149, 152 have been retracted to be clear of the buck base and the structure thereon when said base is rotated about the axis of post 25.

Referring now to FIGURES 1 and 7, the blower-housing assembly includes a housing having a pair of vertically elongated side walls 192, 193, a front wall 190, a rear wall 191, a top wall 195 and a bottom wall 194 that are joined together. The aforementioned housing is mounted by frame members 21, 22 to, for the most part, extend above said frame members. Mounted in the housing vertically intermediate the top wall and the frame members 22 is a heat transfer unit having a plurality of tubes 197 extended longitudinally thereacross for conducting a heating medium such as steam. The rear wall at an elevation vertically above tubes 197 has an outlet 198 for discharging air through a duct 196 that extends outwardly through the rear panel opening 47 and terminates in the ventilation system ducts for the building in which the apparatus of this invention is located, while the top wall has an inlet 199.

Mounted on the top wall 195 is a blower unit 200 having an inlet 200a for withdrawing air within the paneling 43–46 of the garment drying machine and exterior of housing and discharging the air through its outlet 200b to the inlet 199 to move into the upper end of the housing. Advantageously the unit drive motor (not shown) may be mounted on the top of panel 46 and drivingly connected to the remainder of the unit that is within the housing. Beneath the inlet 199 is a baffle 201 that extends between side walls 192, 193 from an elevation slightly lower than the outlet 198 to the elevation of the top wall. The baffle at its lower end is located slightly forwardly of an intermediate position between the housing front and rear walls and is inclined upwardly in a rearward direction to have its upper transverse edge located a substantial distance horizontally forwardly of the rear transverse edge of the inlet 199.

At approximately the same elevation as the lower transverse edge of the outlet 198 and forwardly thereof is a transverse damper rod 203 that is mounted by the housing side walls to extend outwardly of the housing side wall 193. Rod 203 mounts a generally rectangular damper 204 that extends across the space between the side walls and is inclined upwardly in a forward direction at a substantial angle to, in a damper closed position, have a front edge abut against the baffle 201. The damper has a lip 204a extending rearwardly of rod 203 to abut against the rear wall just below the lower edge of the outlet 198 whereby, when the damper is in a closed position, no substantial amounts of air will flow from the inlet 199, thence downwardly between baffle 201 and end wall 191 to a lower elevation in the housing. Further, the damper in the closed position directs the air that goes downwardly between the baffle and rear wall 191 to be discharged through duct 196.

The damper 204 is movable to a position to have its upper edge intermediate the top edge of baffle 201 and the rear edge of the inlet 199 whereby a small amount of air flows from the inlet 199 to the duct 196, a portion of the air flows downwardly in the housing between the damper and baffle 201, and a major amount of the air flows downwardly between the baffle and housing wall 190. In order to move the damper between the aforementioned positions, a radial arm 205 has one end keyed to the end portion of rod 203 that is adjacent to end wall 193 and outwardly of the housing, the opposite end of rod 205 being pivotally connected at 210 to the upper end of the link arm 209. The structure for moving the link arm 209 will be described hereinafter.

The wall 191 at the lower end is angled in three stages to extend downwardly and forwardly to have its lower forward edge join to the rear edge of bottom wall 194. The forward end portions of bottom wall 194 and the side walls 192, 193 together with a front wall horizontal flange that extends beneath frame member 21 provide a lower housing outlet 207 that is at a lower elevation than frame members 22 and the buck base B, and longitudinally aligned with the buck base when the buck base is in a datum position or 180° angular position relative thereto.

In order to block the flow of fluid through the housing from inlet 199 to outlet 207, there is provided a damper 211 that extends between side walls 192, 193; the damper 211 in a closed position having a front edge closely adjacent to the front wall at an elevation just about outlet 207 and a rear edge closely adjacent the rear wall. The damper is curved about transverse horizontal axes such when the damper is in an open position, it facilitates the change of direction of airflow from a vertically downward direction to a horizontally forward direction. The forward intermediate portion of the damper is secured to transverse rod 212 to rotate therewith. The rod is rotatably mounted by the housing side walls to extend outwardly thereof. The end portion of rod 212 extending outwardly of wall 193 has one end of an arm 213 keyed thereto to rotate therewith. The opposite outer end of arm 213 is pivotably connected to the lower end of arm 209 by pivot member 214. Through arms 205, 209, 213 and their pivotal connections, when the damper 211 is in its fully open position (partly illustrated by dotted lines directly above steam valve 215 in FIGURE 1), the damper 204 is in its fully open dotted line position of FIGURE 7.

The end of rod 212 extending outwardly of side wall 192 has one end of an arm 218 keyed thereto, the opposite end of arm 218 extending between the clevised end portion of piston rod 220 and pivotally connected thereto by a pivot member 219. The piston rod 220 is a part of a piston cylinder combination that includes a cylinder 221 that is pivotably connected at 222 to a bracket 223 that is bolted to one of the uprights 23. When air under pressure is applied to one end of cylinder 221, the piston rod 220 is moved to an extended position to, through arm 218, pivot rod 212 and thereby damper 211 in the direction of arrows 224 from the closed position of FIGURE 1 to an open position partly indicated in dotted lines in FIGURE 7.

Pivot member 219 also mounts a cam bar 226 by being extended through an intermediate portion thereof. One end of a coil spring 227 is connected to rod 212 while the opposite end thereof is connected to a stud 228 that is mounted by one end of cam bar 226. Spring 227 resiliently urges the cam bar to pivot about pivot member 219 in the direction of arrow 229, arm 218 having an ear (not shown) for limiting the pivotal movement of the cam bar relative said arm in the aforementioned direction to the position shown in FIGURE 7.

For dispensing steam within the housing at selected intervals to be mixed with the air being discharged through an outlet 207, the steam valve 215 is mounted on housing side wall 192. The steam valve has a rotatable rod 233 that when rotated in one direction through conventional control mechanisms, opens the valve to permit steam to flow therethrough; and when rotated in the opposite direction, closes the valve. Keyed to rod 233 is an intermediate portion of arm 234, one end of arm 234 being pivotably connected by pivot member 236 to piston rod 237 of a piston cylinder combination. The cylinder 238 of the aforementioned combination is pivotably connected at 239 to a bracket that is mounted on upright 23 at a higher elevation than bracket 223.

The end of the arm 234 opposite pivot 236 mounts a roller 235 in a position to be abutted against by the cam bar 226 as arm 218 is rotated from its datum position of FIGURE 7 whereby roller 235, arm 234 and rod 233 are rotated in the direction of arrow 241 by the piston rod 220 being extended. Upon the damper 211 being moved to a partially open condition, the cam follower bar moves roller 235 such that rod 233 is moved to a steam valve open condition. Prior to the dampers being moved to a fully open condition, the cam bar has moved out of contact with roller 235. Since air under pressure is applied to cylinders 239, 221 at the same time, through appropriately adjusted needle valves and cylinder 221 being of a substantially larger cylinder in cross sectional area than cylinder 238, as long as the cam bar is being pivoted in the direction of arrow 224 in contact with roller 235, the air under pressure applied to a cylinder 238 that acts to move piston rod 237 to an extended position is overcome, i.e. piston rod 237 is retracted, and the steam valve is operated to an open condition. However, after arm 226 moves out of contact with roller 235, piston cylinder combination 237, 238 operates to rotate arm 234 to move rod 233 to a steam valve closed condition while piston cylinder combination 220, 221 continues to move the damper 211 to its fully opened position.

At the time damper 211 is to be moved from its fully opened position to a closed position, roller 235 is at a datum position. As arm 218 is rotated in the direction opposite arrow 224 from the damper open position, arm 226 is moved into contact with roller 235, however, since arm 226 is pivotally mounted on pivot member 219, arm 226 pivots in the direction of opposite arrow 229 against the resilient action of spring 227 to permit the cam bar moving past the roller. After the cam bar is moved past the roller, the spring 227 again pivots the cam bar in the direction of arrow 229. As a result, the steam valve rod 233 is not rotated at the time the mechanism for operating the damper 211 returns to a datum condition.

Referring to FIGURES 8 and 9 the structure for mounting the shoulder-collar form assembly 275 includes a pair of spaced bars 276 secured to the upper end of stationary buck head 83 by cap screws 278, the cap screws being extended through spacers 277 intermediate the bars and the buck head 83. Likewise a pair of spaced bars 279 are mounted on the buck head 84 by cap screws 278 and spacers 277. The bars 276, 279 are located more closely adjacent one another than the spacing of the heads 83, 84 while the upper end portions of each set of bars 276 and 279 respectively mounts a cross bar 280. The one ends of the cross bars 280 mount a pivot shaft 281 while the opposite ends of said cross bars mount a pivot shaft 282.

The upper end portion of rod 144 is slideably extended through the central portion of a bracket 285, said bracket having one depending leg secured to buck head 83 and an opposite depending leg secured to buck head 84 for retaining the buck heads in spaced relationship. On the end of rod 144 which is above bracket 285 there is attached a generally U-shaped bracket 286 to have a first set and second set of legs 285a, 285b respectively extend upwardly. The legs 286a have one end of a short link 288 extend therebetween and pivotally connected thereto by pivot member 287, the opposite end of said link being extended between the one end of the pair of bars 289 and pivotally connected thereto by a pivot member 290. A second link 288 has one end pivotally connected to the legs 286b and the opposite end extended between and pivotally connected to the one end of bars 291 by a pivot member 292. Bars 289 are shaped to have intermediate portions extend outwardly of one another, extend between bars 280, and at a location remote from pivot 290, are pivotally mounted on pivot member 282. The end portions of bars 289 that extend outwardly of pivot 282 mount and are retained in spaced relationship by a shaft 293. Bars 291 likewise have intermediate portions that diverge outwardly from pivot 292, and are pivotally mounted on pivot member 281, the end portions of said arms outwardly of pivot 281 mounting and being retained in spaced relationship by a shaft 294.

In order to mount the collar-shoulder form assembly 275 to be vertically movable relative to the stationary buck heads, there are provided clip plates 295, 297 that may be made of sheet metal and are attached to opposite end portions of said assembly. From the juncture with assembly 275, the clip plates curve downwardly and inwardly toward each other, plate 295 thence being curved upwardly and over shaft 293 and then downwardly between shafts 282, 293 to form a U-shaped bend over shaft 293 that opens downwardly. In order to releaseably retain the clip plate 295 on shaft 293, a lockstrip 296 is extended through a slot (not shown) in the portion of the clip plate adjacent pivot member 293 to extend beneath pivot member 293, thence along the surface of the clip plate in the direction toward its juncture with the shoulder form; and has a terminal end portion extended through a second slot (not shown) of clip plate 295. The second slot is of a length that the one end of the lockstrip may be moved upwardly to the dotted line position of FIGURE 8 whereby the opposite end is no longer underlaying shaft 293. As a result, the assembly 275 may be readily disconnected from shaft 293.

Plate 297 after being curved downwardly and inwardly, extends horizontally toward shaft 293 and then is curved around shaft 294 to extend horizontally in the reverse direction to provide a U-shaped portion abutting against shaft 294 that opens in the opposite direction from shaft 293. As a result, in order to remove assembly 275 from shaft 294, it has to be first removed from shaft 293 by being pivoted about shaft 294 and thence away from shaft 294. When assembly 275 is mounted on shafts 293, 294 as shown in FIGURE 8, the U-shaped portion of plate 297 holds the assembly against vertical movement while the U-shaped portion of plate 295 holds the assembly against horizontal movement.

By the above described structure the collar-shoulder form assembly is mounted for movement between a position to have opposite lower edges adjacent the upper edges of the stationary buck heads, and a second position at a lower elevation than that shown in FIGURE 9. The amount of vertical movement of assembly 275 may be, for example, about ⅝ of an inch.

In order to move the shoulder form assembly to its elevated position and resiliently retain it in such a position, a coil spring 269 has its lower end bearing against a collar member 270 that is mounted on rod 144 to move therewith and its upper end bearing against bracket 288. The movement of rod 144 in an upward direction against the action of the spring 269 moves the linkages connected to the upper end of said rod to move the collar-shoulder form assembly to its lower elevation relative the stationary buck heads.

The collar-shoulder form assembly is for the most part made up of a polarity of wires 275a, 275b of sufficiently heavy gauge to retain a given shape while a garment is dressed thereon and is being finished. The wires 275b extend generally crosswise relative wires 275a and are welded thereto at the points they cross one another. The assembly 275 also includes a plate 299 joined to the one end of wires 275a to close the neck opening of the form, plate 299 and wires 275a, 275b providing a collar clamp slot 275c (see FIGURE 8). A strip 275d forming a peripheral edge of the form is welded to the adjacent edges of wires 275a, 275b and to the adjacent upper edges of members 295, 297. With reference to FIGURE 9, the general form of assembly 275 is illustrated rather than the specific wires as would be seen as taken along the line 9—9 of FIGURE 8. No covering is provided on the assembly 275 (other than the plate 299) to interfere with the flow of fluid between wires 275a, 275b and thence through the shoulder and collar portions of the garment.

A collar clamp assembly, generally designated 300, includes a plate 339 bolted to plate 299, a lug 340 being joined to plate 339 and extending outwardly through slot 275c to have one end of a handle 341 connected thereto by a pivot member 342. Dependingly joined to plate 339 is a lug 343 that mounts a pivot member 344 which in turn pivotally mounts the one end of a somewhat T-shaped clamp member 345 having a leg extending outwardly through slot 275c and a cross bar for abutting against the outer surface of the assembly 275. A short link 346 has one end pivotally connected at 347 to an intermediate portion of handle 341 and an opposite end pivotally connected at 348 to an intermediate portion of clamp member 345. Joined to clamp member 345 to extend radially outwardly of pivot 344 is an arm 303, a coil spring 305 being connected to the collar-shoulder form assembly and arm 303 for resiliently urging clamp member 345 in the direction of arrow 304 to the nonclamping solid line position of FIGURE 9. The connection of spring 305 to arm 303 and the link 346 to members 341, 345 and the location of pivot 344 is such to form an overcenter lock; i.e. when the clamp member is in a closed position (dotted lines in FIGURE 9), the handle has to be manually pivoted in the direction of arrow 306 about pivot 342; but after being so moved toward an open position, the spring 305 resiliently urges the clamp member to an open position.

Referring now to FIGURES 1, 5, 10 and 11, the structure for conducting fluid from the blower-housing assembly to be discharged into garments dressed on the buck assemblies will now be described. Mounted on each corner portion of the buck base to extend largely laterally thereof is a duct 310, 311, 312 and 313, respectively generally designated. Ducts 310, 311 are provided for discharging fluid under pressure through top outlet 314 into the lower end portion of the garment dressed on buck assembly 13 while ducts 312, 313 are provided for discharging fluid through outlets 314 into the lower end portion of the garment dressed on buck assembly 14. Thus each duct has an upper portion that in conjunction with the adjacent portion of the respective plate 30, 31 is generally rectangular in horizontal cross section and extends upwardly between the adjacent set of uprights 38, 39 to about the elevation of the cross bars 40. Further, each duct has a side wall 320 parallel to and laterally outwardly of the respective adjacent base plate 30, 31 to be positioned approximately ½ to ¾ of the lateral distance that the wing in an extended condition is located from the respective plate 30, 31. Further, each duct has an inlet 315 at a slightly lower elevation than the lower edges of the buck base that with a small downward extension of plates 30, 31 respectively would be generally rectangular in the horizontal cross section. The length dimension of the duct inlet (in the direction of elongation of the buck base) is substantially larger than the corresponding dimension of the outlet 314. That is, the lower lateral edge of each duct that is most remote from the post 25 and extends perpendicular to the buck base plates 30, 31 is located adjacent to plate 35 and outwardly thereof on the respective end of the buck frame.

When the buck assembly 14 is in the datum position, the inlet of duct 313 is located vertically above the top outlet 316a of duct 316 while the inlet of duct 312 is located vertically above the top outlet 316b of duct 316. The size and shape of each of the outlets 316a, 316b are substantially the same as that of the inlets 315. From outlets 316a, 316b, duct 316 extends rearwardly to have an inlet in fluid communication with the lower outlet 207 of the housing 190–195. The spacing of side walls 318 of duct 316 is the same as the spacing of walls 192, 193, and the same as the spacing of, for example, wall 320 of duct 313 from wall 320 to the duct 312. In order to prevent discharge of air directly under the buck frame, duct 316 has a divider 319 for separating outlet 316a from outlet 316b.

A steam line 327 has one end connected to valve 215 and an opposite end connected to T-joint 323, a pipe 400 having an orifice on the lower end thereof to discharge forwardly being connected to joint 323. Joint 323 is also connected by a line 321 to a pipe 401 having an orifice on the lower end thereof. Pipes 400, 401 extend downward through the top wall of duct 316 to have their lower ends generally transversely aligned with outlets 316b, 316a respectively and to be located rearwardly thereof.

Further, duct 316 is of a construction and is mounted to avoid interference with the rotation of the buck base and the ducts mounted thereon. Additionally, when the buck base is in a datum condition, fluid under pressure flows through outlets 316a, 316b into the inlets 315 of ducts 313, 312 respectively; while when the buck base is rotated 180°, then fluid under pressure flows from outlet 316a to the inlet of duct 311 and from outlet 316b to the inlet of the duct 310. Since the flow of fluid is directly upwardly into the garment, fluid for the most part passes through the garment and is discharged into the main dryer chamber at an elevation above the table 322 that is mounted by the buck base to be rotated therewith. To be mentioned is that the table has appropriate apertures for ducts 310–314 to extend through.

In order to prevent the fluid which has been discharged from ducts 310–314 into the garment flowing toward the operator or dressing station (designated by bracket 330 in FIGURE 1), there is provided a door 324 that extends diametrically on opposite sides of the post 25 intermediate buck assemblies 13, 14. The door has opposite vertical edges to which is respectively secured a resilient flap 324a and top edges to which there is secured a resilient flap 324c. When the buck base is in either its datum position, or 180° position relative thereto, the flaps respectively substantially form a fluid seal with the channels 51 and the top flange 46d. The door 324 extends vertically above the table to the top edge of opening 49 to, when the buck base is either in its datum position, or 180° position relative thereto, preclude any substantial flow of fluid in an area between the table and the top panel 46 outwardly toward the operator station. Since the vertical spacing between the table and the adjacent edge of frame member 19 is substantially less than 4/5 of the height of opening 49, and the blower unit 200 is continuously driven during the operation of the garment drier, the fluid flow between the table and plate 23 is into the cabinet.

Mounted by channel 21 to extend upwardly thereof to the top panel 46 is a central, non-perforated panel 328. Transversely between panel 328 and the respective side wall 44, 45 there is provided a filter 329 that extends between channel 21 and top panel 46. Also, there are provided filters (not shown) that extend beneath frame member 21 and side walls 44, 193 and 45, 192 respectively. As a result of providing the aforementioned structure, fluid discharged through the garment on the buck assembly at the drying station, designated by bracket 331 in FIGURE 1, is drawn by blower unit 200 to pass therethrough and be discharged into the housing 190–195. That is, when the buck base is in either its datum position or 180° position, the filters, panel 328, the door and the table together with the longitudinally intermediate portions of panels 44, 45 provide a nearly enclosed drying chamber while the blower unit is constantly driven to draw fluid through the filters from the drying chamber such that even when the buck base is being rotated, fluid is drawn inwardly through opening 49 to prevent a substantial discharge of hot fluid through said opening toward the dressing station.

Each of the buck heads has a steam cavity (not shown). In order to supply steam to the steam cavities of the buck heads and provide a return for the condensate, a flexible steam supply line 332 and a flexible condensate return line 333 each have their one ends connected to steam supply and condensate return passageways (not shown) in a block 334 that is mounted on block 75 (see FIGURES 1, 3, 5 and 10). The opposite ends of lines 332, 333 are respectively connected through elbows to a joint 335a and a joint 336a of a steam header 335 and a condensate header 336 respectively. When the buck base is in a datum condition, lines 333, 334 extend around post 25 through an angular amount greater than 360° (see FIGURE 10). The direction of rotation of the buck base from its datum position toward its 180° position is such that lines 333, 334 are moved in an unwinding direction relative the post.

The joints 335a, 336a are in part mounted by bracket 338 which is attached to the horizontal central portion of plate 30. Joint 335a has metal steam lines 335c connected thereto and extending outwardly therefrom in opposite directions, said lines being respectively connected through a flexible steam hose 335d and lines (not shown) to the upper end of the adjacent movable buck head 85 and a joint 335b mounted thereon that has a steam hose 335e extending outwardly therefrom in opposite directions to be connected through a line (not shown) to the upper end of the adjacent movable buck head 84.

Two blocks 349 are mounted on plate 30, each being mounted between the adjacent set of uprights 38, 39. A hose 335f is connected to the lower end of buck head 85 and to the block 349 to open through a block bore (not shown) to the line 335g that fluidly connects said bore to the top portion of buck 83. A hose 335h likewise connects the lower end of buck head 93 to block 349 to open through a second block bore (not shown) to line 335i that fluidly connects said second bore to the top portion of buck head 84.

The condensate header includes a pair of metal tubes 336b connected to T-joint 336a to extend outwardly thereof in opposite directions, the outer end of each tube being connected to the respective metal block 349. Each block 349 has a manifold chamber (not shown) and mounts the one ends of a pair of lines 336e, 336d, that are respectively connected to the lower ends of buck heads 83, 84. Tubes 336b and lines 336e and 336d open to the block manifold chamber. Ducts 310, 313 and the table have apertures (not shown) for various portions of the headers to extend therethrough.

Figure 14:
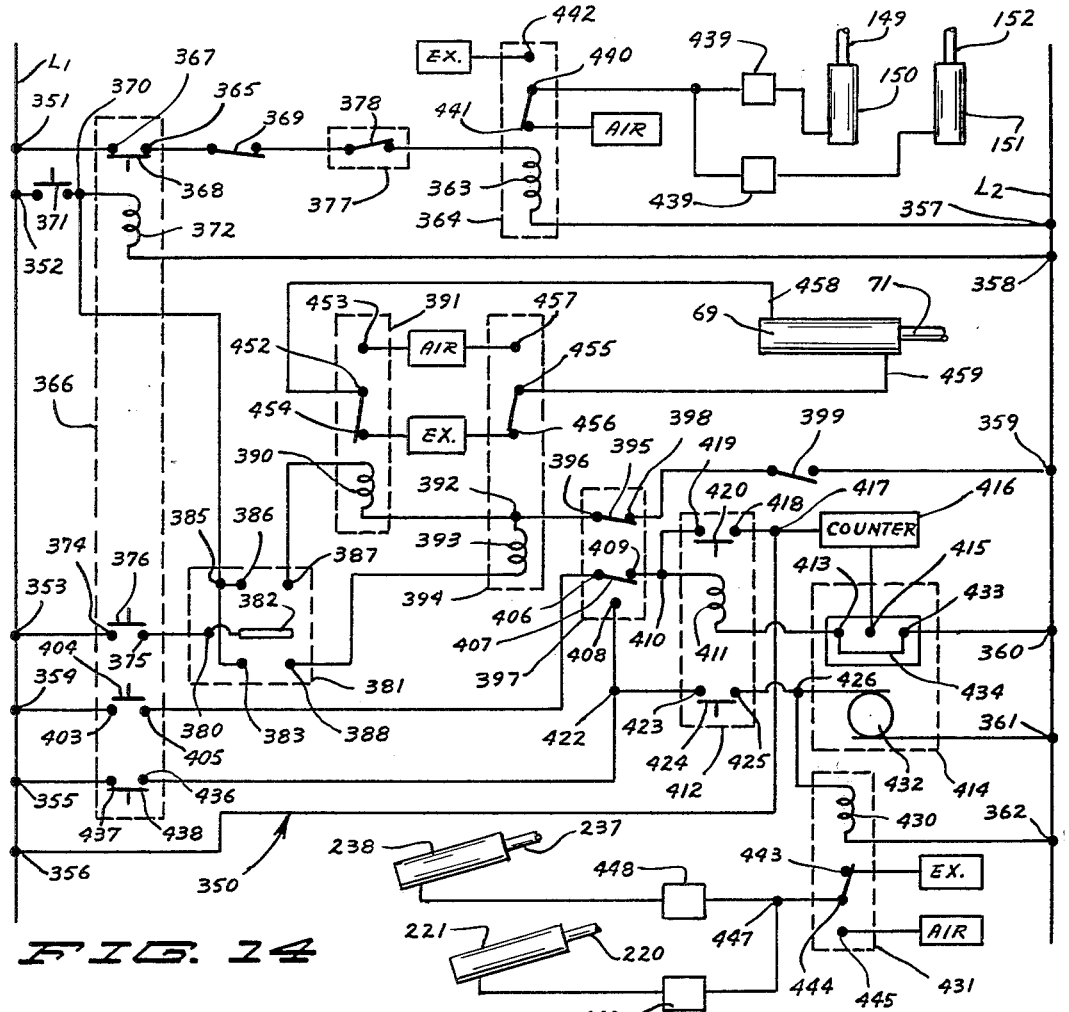
Figure 13:
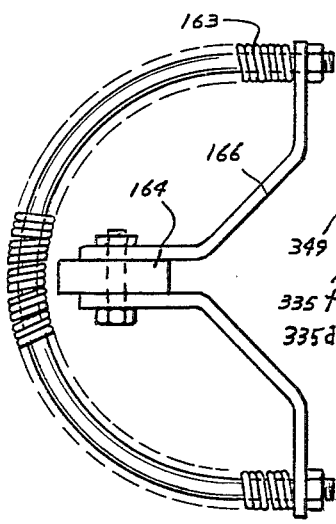
FIGURE 13 is a top view of a wing that is generally taken along the line and in the direction of arrows 13—13 of FIGURE 3.
Figure 12:
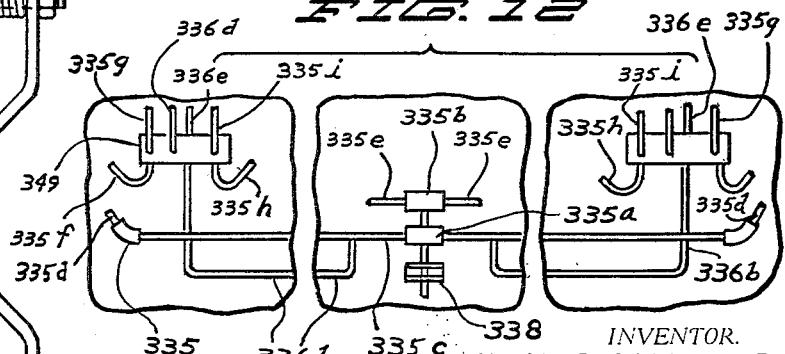
FIGURE 12 is a fragmentary side view of the buck base showing the steam and condensation lines mounted thereon, portions of various members of said view being broken away.

Referring now to FIGURE 14, the electrical and pneumatic control circuitry, generally designates 350, includes main power lines $L_1$ and $L_2$, line $L_1$ having a plurality of junctions 351, 352, 353, 354, 355 and 356 thereon. Line $L_2$ has a plurality of junctions 357, 358, 359, 360, 361 and 362 thereon. A normally closed foot switch 369, switch 377 and the solenoid coil 363 of the solenoid operated air control valve 364 are connected in series across junction 357 and the first terminal 365 of the relay 366. Switch 377 has a switch member 378 that is resiliently retained in an open position through conventional structure (not shown) but is movable to a closed position as will be described hereinafter.

The relay 366 includes a second terminal 367 and a switch member 368 for electrically connecting terminals 365, 367 when the relay is de-energized. A normally open start switch 371 and solenoid coil 372 of relay 366 are connected in series across junction 352, 358, there being provided a junction 370 intermediate members 371, 372.

Relay 366 also includes a third terminal 374 connected to junction 353, a fourth terminal 375 and a switch member 376 for electrically connecting terminal 374, 375 when the relay is energized. Terminal 375 is connected to a terminal 380 of an end switch 381, terminal 380 being connected to a movable switch member 382. The end switch also includes a second terminal 386, a third terminal 387, a fourth terminal 388 and a fifth terminal 383. The end switch 381 is of a construction to have a position that switch member 382 forms an electrical connection between terminals 380, 386, 387, a second position that forms an electrical connection between terminals 380, 383, 388, and effectively an "off" position intermediate the aforementioned position that does not connect terminal 380 to any other of the terminals of the end switch. Terminal 383 is connected by a line to junction 385 which in turn is connected by a line to junction 370 and to terminal 386.

Solenoid coil 390 of the solenoid operated air valve 391 is connected across terminal 387 and junction 392 while a solenoid coil 393 of the solenoid operated air valve 394 is connected across terminal 388 and junction 392. Junction 392 is connected by a line to a first terminal 396 of a damper limit switch 397 which has a switch member 395 for electrically connecting terminal 396 to terminal 398 and breaking the aforementioned electrical connection. A buck control limit switch 399 is provided across terminal 398 and junction 359 for forming an electrical connection therebetween and breaking the aforementioned electrical connection.

The damper limit switch 397 also includes a third terminal 406, a fourth terminal 408, a fifth terminal 409, and a switch member 407 for electrically connecting terminal 406 to terminal 409 and alternately electrically connecting terminal 406 to terminal 408. Terminal 409 is connected by a line to a junction 410, the solenoid coil 411 of a solenoid operated air valve 412 being connected across junction 410 and terminal 413 of the timer 414. A counter 416 is connected across junction 417 and a second terminal 415 of the timer, junction 417 being connected by a line to junction 356 and by a line to the first terminal 418 of relay 412. The relay 412 includes a second terminal 419 connected to junction 410 and a switch member 420 for electrically connecting terminals 418, 419 when coil 411 is energized. The relay also includes a third terminal 423 that is connected to a junction 422, a fourth terminal 425 that is connected to junction 426 and a switch member 424 for connecting terminals 423, 425 when coil 411 is energized. The solenoid coil 430 of the solenoid operated air valve 431 is connected across junctions 426, 362, while the timer motor 432 is connected across junctions 426 and 361. The timer also includes a third terminal 433 that is connected to junction 360 and a switch member 434 that is operated by the timer motor. When the timer motor is in a de-energized condition, the switch member 434 electrically connects terminals 413, 433; and upon energization maintains said connection until the end of the preselected timing cycle. At the end of the preselected time after the time of energization of the timer motor, it operates switch member 434 to break the connection between terminals 413, 433 and electrically connects terminal 413 to terminal 415 for a short interval of time, and then again electrically connects terminal 413 to terminal 433.

The relay 366 includes a terminal 436 that is connected to junction 422, a sixth terminal 437 connected to junction 355 and a switch member 438 that upon energization of solenoid coil 372 breaks the electrical connection between terminals 437, 438. Further, relay 366 has a seventh terminal 403 connected to junction 354, an eighth terminal 405 connected to terminal 406 and a switch member 404 for connecting terminals 403, 405 when coil 372 is energized.

The valve 364 has a control port 440 that is fluidly connected to a junction and thence through needle valves 439 to the lower ends of cylinders 150, 151, an exhaust port 442, and an inlet port 441 connected to a source of air under pressure together with an internal control member to, when coil 363 is energized, fluidly connects ports 440, 441, and upon the de-energization of said coil fluidly connects ports 440, 442. The valve 431 includes an exhaust port 443, an inlet port 445 connected to a source of air under pressure, a control port 444 and internal valve member that upon energization of the coil 430 connects ports 444, 445 and upon de-energization fluidly connects ports 443, 444. Port 444 is connected to a junction 447, junction 447 being connected through a needle valve 448 to the end of the cylinder 238 for applying air under pressure for urging the piston rod 237 toward an extended position, and through a needle valve 449 to the end of cylinder 221 for applying air under pressure for moving the piston rod 220 to an extended condition. As may be noted, air under pressure is applied at the same time to the same ends of cylinders 221, 238. However, since cylinder 221 is much larger, and due to the adjustments of the needle valve 448, 449, when air under pressure is applied to cylinder 221, through bar 226 and members 233–235, piston rod 237 is moved in a retracting direction against the application of air under pressure to the cylinder 238. After bar 218 has rotated in the direction of arrow 224 to move the cam bar 226 to a location out of engagement with roller 236, the aforementioned application of air under pressure to cylinder 238 results in the piston rod 237 being movable to an extended position to operate valve 215 to a closed position.

The solenoid valve 391 includes a control port 452 that is connected by a line 458 to the end of the cylinder 69 adjacent pivot 70, a port 454 connected to an exhaust, an inlet port 453 connected to a source of air under pressure and an internal valve member that upon energization of coil 390 fluidly connects port 452 to port 453 and upon de-energization fluidly connects port 452 to port 454. Solenoid valve 394 includes a control port 455 fluidly connected by a line 459 to the opposite end of cylinder 69, a port 456 connected to the exhaust, an inlet port 457 connected to the source of air under pressure and an internal control member that upon energization of coil 393 fluidly connects ports 455, 457 and upon de-energization fluidly connects ports 456, 455. Since the piston cylinder combination 69, 71 does not include an internal spring, if both ports 454, 456 are connected to the exhaust, the piston rod will remain in the position resulting from the last application of air under pressure to the respective end of the cylinder.

End switch 397 is mounted on frame member 19 in a position to have its operating arm 482 moved by set screw 485 to operate switch member 382 to electrically connect terminals 386, 387 when the buck base is in the datum position (see FIGURE 5), set screw 485 being mounted by one end portion of arm 73. A second set screw 483 is mounted on arm 73 to, just as the buck base is rotated 180° in the direction of arrow 481 from the datum position, move arm 482 to operate switch member 382 to electrically connect terminals 383, 388. When neither of set screws 483, 485 abuts against arm 482, switch member 382 is in its "off" position.

Mounted on switch 397 is the switch 377, switch 377 having an operating arm (only partially shown in FIGURE 5) that is forced by an arm 461 to move switch member 378 to a closed position through conventional structure (not shown) when the buck base is in a datum position while an arm 462 also forces the operating arm of switch 377 to move switch member 378 to a closed position when the buck base is 180° out of its datum position. At the time the buck base is in neither of its datum position or 180° position, switch member 378 is open. Arm 462 is attached to arm 73 adjacent set screw 483 while arm 461 is attached to arm 73 adjacent set screw 485. Through the provision of switch 377, solenoid coil 363 cannot be energized when the buck base is intermediate its datum and 180° position whereby piston rods 149, 152 would be moved to their extended positions.

The structure of the apparatus of this invention having been described, the operation thereof will now be set forth. For purposes of facilitating the description of the operation, it will be assumed that at the beginning of the day's run the buck base is in its datum condition, i.e. buck assembly 13 is in the position illustrated in FIGURE 1 for assembly 14 and the piston rod 71 retracted; and that no power is applied across main lines $L_1$, $L_2$. The switch member 378 is closed; switch member 382 electrically connects terminals 386, 387; switch member 399 is closed; switch member 395 electrically connects terminals 396, 398; and switch member 407 electrically connects terminals 406, 409. Accordingly, as soon as air under pressure is applied to the solenoid valves and power is applied to main lines $L_1$, $L_2$, the blower is continuously driven through an electric circuit (not shown) and coil 363 is energized to apply air under pressure to the lower ends of the cylinders 150, 151. This results in piston rods 149, 152 moving to an extended position whereby the limit switch operating arm 157 is forced by the respective piston rod cam surface to move switch member 399 to an open condition. When switch member 399 is open, air under pressure cannot be applied to either end of the cylinder 69. Further, since the start switch 371 is open, relay 366 has not yet energized and thus there was no circuit to energize coil 390 prior to this opening of switch 399.

Upon piston rod 152 moving upwardly from a retracted position, it engages button 153 of buck assembly 13 to force the buck lever 102 to pivot in the direction of arrow 120 from the position illustrated in FIGURE 2 to the position illustrated in FIGURE 4. (Note: Even though in describing the structure of the buck assemblies, FIGURES 2–4 was referred to as being that of assembly 14, the structure of assembly 13 is in the same relative position as shown in FIGURES 2–4 when the buck base is in a datum position.) The aforementioned pivotal movement of the buck lever moves pivot 105 to a lower elevation and moves link 104 to pivot the lower end of arm 87 about pivot 88 in the direction of arrow 472. This moves the upper end of the movable buck head 85 away from stationary buck head 83. At the same time as arm 87 is being pivoted in the direction of arrow 472, the lever protrusion 102a through pivots 111, 113, and arm 112 moves the lower end portion of the movable presser head 85 away from the lower end portion of buck head 83; but a lesser amount than the upper portion of the head 85 is moved away from head 83.

The aforementioned pivotal movement of arm 87 in the direction of arrow 472 through link arm 90 moves pivot member 91 the same amount that pivot member 111 is moved but in the opposite direction. As a result, the lower end of the movable buck head 93 is moved away from the stationary buck head 84. Also, lever protrusion 102a through pivot members 99, 101 and link 100 pivots arm 97 in the direction of the arrow 474 about pivot 98 to move the upper end of the head 93 away from head 84 a greater distance than the lower end of head 93 is moved away from head 84. Thus applying air under pressure to the cylinder 151 results in the movable buck heads 85, 93 of assembly 13 being moved in the opposite directions outwardly from the respective stationary buck to an open, buck dressing position.

At the same time that air under pressure is being applied through a cylinder 151, air under pressure is applied to cylinder 150 to elevate the piston rod 149 to thereby elevate rod 147 relative bracket 37. This moves rod 147 upwardly from the position illustrated in FIGURE 3 to the position illustrated in FIGURE 4. The movement of rod 143 upwardly through arm portion 133a pivots the arm 133 in the direction of arrow 475 about pivot member 125; and through arm portion 127a pivots the arm 127 in the direction of the arrow 476 about pivot 126. This moves the wing brackets of assembly 13 from the wing expanded condition of FIGURE 3 toward one another to in a fully wing retracted position, have bracket portion 129a located substantailly directly above pivot 125 and bracket portion 135a is located substantially directly above pivot 126.

Rod 143 in being moved upwardly also moves rod 144 upwardly to through bracket 286 move pivot members 287 upwardly the same amount. This movement of pivot members 287 through links 288 moves the adjacent ends of arm 289, 291 upwardly and toward one another, i.e. pivot bar 289 in the direction of arrow 478 about pivot member 282 and bar 291 in the direction of arrow 479 about pivot member 281. As a result the collar-shoulder form assembly is moved against the action spring 269 to a lower elevation. Now a garment is dressed on the buck assembly such that the back part of the garment extends between heads 84, 93 and the front portion of the garment extends between heads 83, 85. The collar portions of the garment are drawn together and the collar clamp handle 341 operated to move the clamp bar 345 downwardly to the dotted line position of FIGURE 9 to clamp the collar portions of the garment against assembly 275. Thereafter the garment is straightened and the foot switch depressed to move it to an open position. This results in solenoid coil 363 being de-energized and thereby cylinders 150, 151 being connected to the exhaust. Upon air exhausting from cylinder 151, piston rod 152 moves downwardly and the buck lever, through the resilient action of the spring 119, is pivoted about pivot member 103 in the direction opposite to arrow 120. This pivotal movement of the buck lever through the structure previously described moves the lower ends of the movable buck heads more closely adjacent to one another and the upper end portions more closely adjacent to one another to clamp the back portion of the garment between buck heads 93, 84 and the front portion between buck heads 83, 87.

As air is exhausted from cylinder 150, piston rod 149 moves downwardly whereupon spring 269 moves rod 144 downwardly. As a result of springs 167, 168 acting through the wing linkages, the wing brackets and the wings mounted thereon are moved away from one another (also downwardly a limited amount) to draw the garment taut in a horizontal direction. Also rod 144 through its connections to arms 289, 291 causes said arms to pivot in the direction opposite arrows 478, 479 respectively about pivot members 282, 281 to move the collar-shoulder form assembly to the elevated condition of FIGURES 8 and 9 relative the stationary buck heads to draw the garment taut in a vertical direction.

Since the rate of exhaust of air from cylinders 150, 151 is controlled such that piston rod 149 moves down slower than piston rod 152, the movable buck heads clamp the garment against the stationary buck heads before there is any substantial movement of the collar-shoulder form assembly and the wings. Further, to be mentioned is that the padding on the buck heads holds the garment sufficiently tight so as not to require any buttoning of the garment, but still permit limited movement of the garment portions between the heads to straighten out wrinkles in said portions, and retain portions of the garment between the heads while the wings and collar-shoulder form assembly draw the garment taut.

Upon both the piston rods 152, 149 moving to a fully retracted position, the limit switch control member 157 is pivoted about pivot 158 in the direction of arrow 160 to move the limit switch 399 to a closed position.

While the foot switch is still being depressed, the start switch 371 is depressed to energize the solenoid coil 372 of relay 366, this moving switch member 368 to an open position to prevent the application of air under pressure to cylinders 150, 151 even though the pressure on the foot switch is released to allow switch member 369 being resiliently returned to a closed position. Energizing relay 366 moves switch member 376 to a closed position to through switch member 382 contacting terminal 386 and the lines connecting terminal 386 and junctions 385, 370, provide a circuit to maintain coil 372 energized even though switch member 371 is allowed to move to an open position; switch member 438 to an open position to prevent the timer motor 432 being energized at this time even though switch member 424 is moved to a closed position; and to move switch member 404 to a closed position to energize relay 412. Energizing relay 412 moves switch members 420, 424 to a closed position, switch members 420, 434 now providing a circuit to maintain relay 412 energized even though relay 366 is subsequently de-energized. However, the damper solenoid valve 431 and timer motor 432 are not energized at this time since switch member 438 is open and limit switch member 407 electrically connects terminals 406, 409.

The energization of relay 366 in moving switch member 376 to a closed position provides an electrical connection between junction 353 and terminal 380 of the end switch. Since the buck base is in a datum position, the control arm through screw 482 retains end switch 381 in the condition that switch member 382 is in a position to electrically connect terminals 386, 387; and thus upon the energization relay 366, solenoid coil 390 is energized whereupon air under pressure is applied through port 452 to the end of cylinder 69 to move piston rod 71 to an extended position. The piston rod 71 in being moved to an extended position pivots the control arm 73 about pivot 74 in the direction of arrow 480. Since the control arm extends transversely beneath the buck base, the aforementioned movement of arm 73 through arm 76 exerts a force through pivot 78 to pivot the buck base in the direction of arrow 481 relative the vertical axis of post 25 and moves arm 461 away from switch 378 whereupon switch member 377 opens. During the extending movement of the piston rod 71, arm 73 is moved such that arm 462 operates switch 377 toward a closed position, the set screw 485 on the control arm is moved such that the operating arm 482 moves and thereby switch member 382 moves to break the electrical connection between terminals 386, 387 and thence set screw 483 through arm 482 moves switch member 382 to a position to electrically connect terminals 383, 388. At this time buck assembly 13 is at the drying station and buck assembly 14 is at the dressing station. Also arm 462 has operated switch 377 to a closed condition.

The lapsed period of time between which switch member 382 had formed an electrical connection between terminals 386, 387 and then establishes an electrical connection between terminals 383, 388 is sufficiently great that relay 366 is de-energized and switch member 376 moves to an open position. Thus at the time the electrical connection between terminals 383, 388 is established and until after the start switch is depressed, there is no closed circuit between main lines $L_1$, $L_2$ for energizing either of solenoid coils 390, 393.

After the end switch member has moved to de-energize relay 366 (connect terminals 383, 388), switch member 438 moves to a closed position to complete the circuit for energizing the solenoid damper valve 431 and accordingly apply air under pressure to cylinder 221 whereby the dampers are moved from their datum positions to their open positions. Linkage arm 205 in initially moving damper 204 to an open condition results in the damper limit switch 397 having switch member 395 opened to prevent a transfer of the buck base while air is being blown through the blower-housing and ducts upwardly toward the buck assembly 13 which is now at the drying station, and switch member 407 moving to a position to electrically connect terminals 406, 408.

At the same time that valve 431 was energized, power was applied to timer motor 432, which is connected in parallel to coil 430, to start the time cycle. At the end of the timing cycle of the timer, the timer motor operates switch member 434 to break the electrical connection between terminals 413, 433 and as a result relay 412 is de-energized. This opens switch member 424 and as a result solenoid coil 430 is de-energized. Thereupon air is exhausted from cylinders 238, 221 and through a spring return of piston rod 220, the damper linkage is operated to move the dampers to a datum position. Upon the dampers being returned to a datum position, switch member 395 moves to a closed position such that the buck frame transfer cylinder may again have air under pressure applied thereto if the other necessary switch members are closed, and switch member 407 moves to electrically connect terminals 406, 409.

During the interval of time that dampers are open for blowing air and steam into the garment on the buck assembly 13 at the drying station, the buck assembly 14 was at the dressing station. At the time the relay 366 was de-energized through the operation of the end switch moving through its "off" position to connect terminals 383, 388, switch member 368 moved to a closed position, and since the foot switch 369 and switch member 378 were in a closed position, valve 364 was energized whereupon air under pressure was applied to cylinders 150, 151 to operate the wing retracting mechanism and the shoulder-collar form mechanism of assembly 14 in the manner previously described with reference to buck assembly 13.

In the event that the dressing of a garment on the second buck assembly 14 has not been completed, or both the start switch closed and the foot switch opened, before the dampers have again returned to their datum condition after the garment on buck assembly 13 has been dried, the cycle of operation is the same as described above except that valve 394 is energized instead of valve 390 and thereafter switch member 382 moved through its "off" position and thence to electrically connect terminals 386, 387. However, if the blower damper solenoid valve 431 is still energized, i.e. the garment on the buck assembly 13 is still being dried and the dressing of buck assembly 14 is completed, the operator depresses the foot switch whereupon air is exhausted from cylinders 150, 151 so that upon the piston rods of the said cylinders being fully retracted, limit switch 399 is closed. Then the starter button is depressed while the foot switch is depressed to energize relay 366, but solenoid coil 393 is not energized at this time since switch 395 is still open. However, since switch member 382 now contacts terminal 383, upon switch member 376 closing, there is provided a circuit through terminals 380, 383 and junctions 385, 370 to maintain coil 372 energized even though switch member 371 is allowed to move to its open position; switch member 369 being allowed to close and switch member 371 to open after relay 366 is energized. This energization of relay 366 opens switch member 438, but since it also closes switch member 404 and switch member 407 connects terminals 406, 408, the timer remains energized until the timer motor 432 operates switch member 434 to break the electrical connection between terminals 413, 433 to de-energize relay 412.

Since relay 366 is energized, the de-energization of relay 412 opens switch member 424 to prevent the timer motor being energized and opens switch member 420 to de-energize the damper solenoid valve. This connects the piston cylinder combinations 237, 238 and 220, 221 to the exhaust and thereupon operates the damper linkages to move switch member 407 to electrically connect terminals 406, 409; and switch member 395 to complete the circuit for energizing the buck transfer solenoid coil 393. This movement of the switch member 407 again energizes relay 412; however, at this time, switch 438 is open and accordingly the damper solenoid valve 431 cannot presently be energized. Additionally, since at this time switch member 382 electrically connects terminals 383, 388, upon the damper limit switch member 395 moving to a closed position, the solenoid valve 394 is energized to provide a fluid connection between ports 455, 457 and thereby air under pressure through line 459 to cylinder 69. This results in the piston rod 71 being retracted, thereby moving the buck base to its datum position. At the time the buck base approaches its datum position, set screw 485 is moved into engagement with arm 482 for moving arm 482 to move switch member 382 through an "off" position and thence to form an electrical connection between terminals 386, 387. This movement of switch member 382 de-energizes solenoid valve 394 and relay 366. Also at the time switch member 382 is thus moved, switch member 378 is moved to a closed position by arm 461.

Since some of the garments to be dried may be partially dried or fully dried prior to being dressed on the buck assembly of this invention, in order to have all the garments of the same dampness and to dampen the garments so that wrinkles are not dried into the garment, the steam valve starts to discharge steam through line 321 into duct 316 just after dampers 204, 211 have been moved, for example, about ¼ of the way to their open position. The reason for this is to provide a flow of air through duct 316 to mix with the steam and direct the steam to flow into the lower end of the garment at the drying station. However, prior to the dampers being moved to their fully open position, steam valve 215 is closed. Further, since there is always provided a fluid flow path from inlet 199 to duct 196, moist air is always being discharged from the cabinet (as long as the blower unit is operating) to keep the moisture level of the recycled air sufficiently low to permit the garment to be dried after the steam valve is closed.

The horizontal widths of surfaces 83a, 85a for the most part are substantially the same as those of the respective adjacent surfaces 84a, 93a at the same elevations in the garment clamping position. Even through the padding covering the substantially planar surfaces 83a, 85a and 84a, 93a of the respective pair of buck heads bears against substantial areas of the garment to be finished, since the buck heads are steam heated, the garment is dried in these areas. Other than for the areas that the padding bears against the garment, the garment (in the garment drying condition) only bears against the wing garment engaging members (wire or rods) of the wings and the open meshed wiring of the collar-shoulder form assembly with the collar clamp in engagement therewith and fluid can readily pass between said garment engaging members and the open mesh portions of the collar-shoulder form assembly. Further, the vertical height and the width of plates 295, 297 are not sufficiently great to prevent adequate flow of fluid through the sleeve portions of the garment for drying the sleeves.

What is claimed is:

1. Garment drying apparatus that has a dressing station and a drying station, said apparatus comprising a first and a second buck assembly for having garments dressed thereon that include body portions, first means movablye mounted on the frame for mounting said first and second buck assemblies in spaced relationship to move therewith to position one buck assembly at the drying station and the other at the dressing station and alternately position the one buck assembly at the dressing station, power means on the frame for moving the first means to move the one buck assembly from the drying station to a given position at the dressing station and the other buck assembly to a given position at the drying station and thereafter move the one buck assembly to the given position at the drying station, and second means mounted on the frame for discharging hot fluid toward the garment dressed on the buck assembly that is located at the drying station, each buck assembly including a shoulder form assembly, third means for mounting the shoulder form assembly on the first means at an elevated position relative the first means, and fourth means connected to the third means for coacting with the third means and the shoulder form assembly for drawing the body portion of the garment to a generally taut condition.

2. The apparatus of claim 1 further characterized in that each buck assembly includes a first buck head stationary mounted on the first means, a second buck head, and operable fifth means mounted on the first means for mounting and moving the second buck head away from the first buck head to a garment dressing position and alternately toward the first buck head to a garment clamping position, and there is provided second power means at the dressing station for operating the fifth means of the buck assembly at the given position at the dressing station to move the second buck head thereof to its garment dressing position, said second power means being connected to the frame.

3. The apparatus of claim 2 further characterized in that each buck assembly includes a third buck head stationarily mounted on the first means on the opposite side of the first buck head from the second buck head and spaced from the first buck head in one horizontal direction, and that the third means of each buck assembly has a pair of vertically elongated wings, sixth means mounted on the first means for mounting and moving the wings in opposite directions between a retracted position adjacent the first and third buck heads and an extended position away from said first and third head in a direction lateral to said one horizontal direction and means for urging said sixth means to move said wings to their extended position.

4. The apparatus of claim 3 further characterized in that each buck assembly includes operative seventh means to move the sixth means of the respective buck assembly to move the wings to their retracted position, and that there is provided third power means at the dressing station for operating the seventh means to move the sixth means for moving the wings to their retracted position, each of the second and third power means including a piston cylinder combination having a piston rod movable between a retracted position and an extended position for respectively operating the fifth means whereby the second buck head is moved to its garment dressing position and seventh means whereby the wings are moved to a retracted position, and control means for blocking operation of the first mentioned power means to rotate the first means when at least one of the piston rods in out of its retracted position.

5. The apparatus of claim 3 further characterized in that the first means includes a buck base, that each buck assembly includes a fourth head, that the fifth means mounts the fourth head on the opposite side of the third head from the first head for movement away from the third head to a garment dressing position and alternately toward the third head to a garment clamping position, each of the second and fourth heads having intermediate portions and lower end portions, said fifth means including a first arm having an upper end portion pivotally connected to the second head intermediate portion and an intermediate portion pivotally mounted on the base, and a lower end portion, a second arm having an upper end portion pivotally connected to the fourth head intermediate portion, an intermediate portion pivotally mounted on the base, and a lower end portion, a buck lever pivotally mounted on the base for rotation in opposite directions and linkage means connecting the buck lever to said arm lower portions, one arm lower portion to the second head lower portion and the fourth buck head lower portion to the buck lever for moving the second and fourth buck heads toward their garment dressing position as the buck lever is pivoted in one direction.

6. The apparatus of claim 1 further characterized in that the first means includes a horizontally elongated buck base having opposite end portions, one buck assembly being mounted on one base end portion and the other buck assembly being mounted on the other base end portion, and means mounted on the frame for mounting the buck base for rotation about a vertical axis.

7. The apparatus of claim 6 further characterized in that the power means is connected to the buck base and that there is provided control means to operate the power means to first rotate the buck base 180° in one angular direction and thereafter 180° in the opposite angular direction.

8. The apparatus of claim 6 further characterized in that there is provided a cabinet on the frame, said cabinet surrounding the drying station and having a front opening intermediate the drying station and the dressing station, and a door mounted on the buck base intermediate said buck assemblies to block a major portion of said front opening when either one of the buck assemblies is at the given position at the drying station.

9. The apparatus of claim 8 further characterized in that said second means includes a blower-housing assembly mounted in said cabinet, said blower-housing assembly including a housing having an inlet and a first outlet, and a blower unit for drawing fluid exteriorily of the housing and within the cabinet and discharging it into the housing, and duct means connected to the housing outlet to conduct fluid passing through the housing outlet and discharge it in a general direction toward the buck assembly at its said given position at the drying station.

10. The apparatus of claim 9 further characterized in that said housing has a second outlet more closely adjacent the inlet than the first outlet, that there is provided a duct connected to the housing for conducting fluid from the second outlet to a location exterior of the cabinet; and that the blower-housing assembly has first damper means movably mounted within the housing for varying the volume of flow of fluid through the second outlet.

11. The apparatus of claim 10 further characterized in that the blower-housing assembly has second damper means mounted in the housing intermediate the first outlet and the first damper means for movement between a first position substantially blocking fluid flow between the housing inlet and the housing first outlet and an open second position, and that there is provided means for moving the second damper means toward its open position and at about the same time move the first damper means to decrease the flow of fluid between the housing inlet and the housing second outlet.

12. The apparatus of claim 10 further characterized in that each third means includes a pair of spaced, vertically elongated buck heads mounted on the buck base, and that the fourth means includes a pair of wings, fifth means mounted on the base for mounting said wings for movement in opposite directions generally laterally relative the direction of spacing of the buck heads between a retracted position and an extended position more laterally remote of the buck heads than the retracted position and sixth means for resiliently urging said fifth means to move the wings toward their extended position.

13. The apparatus of claim 12 further characterized in that the buck heads have upper end portions, that the third means includes seventh means for mounting and moving the shoulder form assembly between a first position adjacent the buck heads upper end portions and a second position at a higher elevation than its first position, and that the fourth means includes operative eighth means for operating the fifth means to move the wings toward a retracted position and the seventh means to move the shoulder form assembly toward its first position.

14. The apparatus of claim 13 further characterized in that second and third duct means are mounted on the base to rotate therewith to direct fluid upward into a garment dressed on the respective buck assembly into the area between the buck heads and the wings in their extended position, the second duct means being mounted adjacent one buck assembly and the third duct means being mounted adjacent the other buck assembly, each of said second and third duct means having an inlet to have fluid discharged thereinto from the second discharge means when the respective adjacent buck assembly is at the given position at the drying station, and that there is provided power means mounted on the frame adjacent the dressing station for operating the eighth means of the buck assembly at the dressing station to through the respective seventh means move the shoulder form assembly to its first position and the wings to their retracted position.

15. Garment finishing apparatus having a dressing station and a drying station comprising a frame, a plurality of buck assemblies, a buck base having a central portion, a first end portion extending horizontally away from the central portion in one direction and a second end portion extending horizontally away from the central portion in a second direction, first mounting means mounted on the frame and connected to the base centeral portion for mounting the base for rotation about a vertical axis between a first position that the first end portion is at the drying station and the second portion is at the dressing station and a second position that the second portion is at the drying station, a plurality of buck assemblies, one of the buck assemblies being mounted on said first portion and a second of said assemblies being mounted on the second portion, the one buck assembly having a pair of spaced buck heads mounted on the base to extend thereabove, a garment shoulder form assembly, second mounting means for mounting the shoulder form assembly on the buck heads to extend thereabove, first and second clamp means for clamping adjacent portions of the garment to the adjacent buck head, each clamp means having a vertically intermediate and lower portions, operative third means mounted on the buck base for mounting the first and second clamp means to have the buck heads extend upwardly therebetween and move the clamp means between a first open garment dressing position and a second closed garment clamping position, power means mounted on the frame for selectively rotating the buck base about said axis, and fourth means on the frame for discharging fluid generally upwardly toward the buck assembly at the drying station to contact the garment dressed thereon.

16. The apparatus of claim 15 further characterized in that the one buck assembly includes a pair of wings, fifth means mounted on the base to at least partially extend between the buck heads for mounting the wings and moving the wings in opposite directions between a retracted position and an extended position horizontally more remote of the buck heads than the retracted position and operative sixth means connected to the fifth means for operating the fifth means to move the wings between their positions.

17. The apparatus of claim 16 further characterized in that the second mounting means includes seventh means for mounting the shoulder form assembly for limited vertical movement relative the buck heads between an elevated position and a lower position relative the buck heads and that the sixth means includes means connected to the seventh means for operating the seventh means to move the shoulder form assembly to its lower position as the wings are moved to their retracted position.

18. The apparatus of claim 16 further characterized in that power means is mounted on the frame at the dressing station for operating the sixth means to move the fifth means to move the wings to their retracted position when the one buck assembly is at the dressing station.

19. The apparatus of claim 15 further characterized in that there is provided power operated fifth means mounted on the frame adjacent the dressing station for operating the third means to move the clamp means to their garment dressing position when the buck base has been rotated to position the one buck assembly at the dressing station.

20. The apparatus of claim 19 further characterized in that the third means includes a first arm having an intermediate portion pivotally mounted on the base, a first end portion, and a second end portion pivotally connected to first clamp means intermediate portion, a second arm having an intermediate portion pivotally mounted on the base, a first end portion and a second end portion pivotally connected to the second clamp means intermediate portion, a buck lever pivotally mounted on the base and linkage means connected to the buck lever, the arms first end portions and the clamp means lower portions for moving the clamp means lower portions away from the buck heads and the arms to move the clamp means intermediate portions away from the buck heads when the lever is pivoted in one direction, and that the fifth means includes a piston cylinder combination mounted on the frame for pivoting said lever in said one direction.

21. The apparatus of claim 20 further characterized in that the third means includes resilient means for urging the buck lever to pivot in the opposite direction and that said combination has a piston rod that pivots said lever in said one direction when said piston rod is extended and that there is provided control means for blocking actuation of the first mentioned power means when the piston rod is extended.

22. The apparatus of claim 21 further characterized in that the fourth means includes a housing having an inlet and an outlet, damper means movably mounted in the housing for, in a first position, blocking flow of fluid between said inlet and said outlet and in a second position permitting the flow of fluid between said inlet and said outlet, and second power means for moving said damper means between said positions, said control means including means for blocking the actuation of the first mentioned power means while the damper means is in its second position.

23. The apparatus of claim 22 further characterized in that the fourth means includes duct means for conducting fluid from said housing outlet and discharging fluid toward the buck assembly at the drying station, but there is provided operative means for discharging steam into said duct means and that the control means includes means operated by the second power means moving the damper means toward its second position for operating the steam means to discharge steam and then before the damper means moves to the damper means second position to operate said steam discharge means to discontinue the discharging of steam into said duct means.

24. Apparatus for finishing garments comprising a longitudinally elongated frame, a cabinet mounted on the frame and having an outlet and a front opening, a buck assembly for having a garment dressed thereon, first means mounting the buck assembly for rotation about a vertical axis adjacent the front opening between a first position within the cabinet and a second position outside of the cabinet, said first means being connected to the frame, a blower-housing assembly mounted on the frame and within the cabinet, said blower-housing assembly including a housing having an inlet, a first outlet and a second outlet more remote from the inlet than the first outlet, a blower unit having an inlet opening exterior of the housing and an outlet connected in fluid communication with the housing inlet for discharging fluid into the housing, and damper means mounted in the housing for movement between a first position permitting fluid flow between the housing inlet and the housing first outlet and a second position for decreasing the amount of fluid flow between the housing inlet and the housing first outlet, duct second means mounted on the first means to move therewith for directing fluid to flow into the garment dressed on the buck assembly, third means connected to the housing in fluid communication with the housing second outlet for discharging fluid to flow into said second means when the buck assembly is in its first position, means mounted on the first means for substantially closing said opening when the buck assembly is in its first position, and duct fourth means mounted in fluid communication with the housing first outlet and extending through the cabinet outlet for discharging fluid exterior of the cabinet at a location remote from the buck assembly first position.

25. The apparatus of claim 24 further characterized in that second damper means is mounted in the housing intermediate the first mentioned damper means and the housing second outlet for movement between a first position substantially blocking the flow of fluid within the housing between the housing inlet and the housing second outlet and a second open position, operable fifth means connected to said damper means for moving them to their first positions and alternately to their second positions and automatic control means for operating the fifth means to move the damper means from their second positions to their first positions after the buck assembly has been moved to its first position and after a given time interval return the damper means to their first positions.

26. The apparatus of claim 25 further characterized in that operable sixth means is connected to the third means for discharging steam into the third means and alternately discontinue the discharge of steam, said fifth means including means for operating the sixth means to discharge steam as the damper means are moved toward their first positions and discontinue the discharge of steam prior to the damper means being moved to their first positions.

27. The apparatus of claim 24 further characterized in that the first means includes a buck base, that the buck assembly includes a pair of vertically elongated buck heads mounted on the buck base in spaced relationship to extend thereabove, a pair of wings, seventh means mounted on the buck base for mounting and moving the wings in opposite directions between a retracted position adjacent the buck heads and an extended position outwardly of said heads, and operable means connected to the seventh means for moving the seventh means to move wings between their positions, said duct second means having an outlet opening upwardly to discharge fluid into an area intermediate said heads and the wings in an extended condition.

28. The apparatus of claim 24 further characterized in that the first means includes a horizontally elongated buck base, a pair of vertically elongated buck heads having upper end portions and mounted on said base to extend thereabove, a shoulder form assembly, means mounted on buck heads upper portions for mounting the shoulder form assembly, means for clamping garment portions against said heads, and operable means mounted on said base for mounting and moving the clamping means between an open position and a garment portion clamping position, said second means at least in part opening to discharge fluid upwardly between said heads.

29. The apparatus of claim 28 further characterized in that power means is mounted on the frame exterior of the cabinet for operating said operable means to move the clamp means to an open position when the buck assembly is in its second position.

30. The apparatus of claim 29 further characterized in that the buck assembly includes first and second wings, means at least partially extending between the buck heads for mounting the wings on the base and moving the wings in opposite directions between a retracted position and an extended position horizontally more remote of the buck heads than in the retracted position, operable seventh means on the buck base for operating the wing moving means to move the wings between their positions and power means mounted on the frame exterior of the cabinet for operating the seventh means whereby the wings are moved to their retracted position when the buck base is in its second position.

31. The apparatus of claim 30 further characterized in that the shoulder assembly mounting means includes means mounted on the heads for moving the shoulder form assembly a limited amount between a first position adjacent said heads and a second position at a higher elevation than the first position and that there is provided means connected to shoulder form assembly moving means to move the shoulder form assembly toward its second position as the wings are moved toward their extended position.

32. In the apparatus for finishing garments, a buck base, a first and a second vertically elongated buck head, first means for attaching the buck heads to the buck base in spaced relationship in a given direction and to extend above the base, each buck head having a surface remote from the other buck head, and second means mounted on the buck base for clamping a garment against the buck heads, said second means including a vertically elongated first clamp head, a vertically elongated second clamp head, each clamp head having a lower end portion and a vertically intermediate portion, a first arm pivotally connected to the first clamp head intermediate portion and movably mounted on the base for mounting the first clamp head intermediate portion for movement relative the first buck head remote surface between a garment clamping position and an open position, a second arm pivotally connected to the second buck head intermediate portion and movably connected to the base for mounting the second head intermediate portion for movement relative to the second head remote surface between a garment clamping position and an open position, and operable third means mounted on the base and connected to the first and second arms and the buck head lower portions for operating the arms to move the clamp heads intermediate portions between the garment clamping position and the open position and the clamp heads lower portions between a garment clamping position and an open position.

33. The apparatus of claim 32 further characterized in that the third means includes a buck lever, fourth means for pivotally mounting the buck lever on the base, and fifth means connected to the buck lever, the arms and the clamp heads lower portions for moving the arms and the clamp heads lower portions to move the clamp heads to a garment open position when the lever is pivoted in one direction and to a garment clamping position when the lever is pivoted in the opposite direction.

34. The apparatus of claim 33 further characterized in that there is provided sixth means connected to the buck base for resiliently urging the lever to pivot in a direction opposite said one direction, and power operated means adjacent the buck base for moving said lever in said one direction.

35. The apparatus of claim 33 further characterized in that each arm has a lower end portion opposite its pivotal connection to the respective clamp heads and that the fifth means includes first linkage means for pivotally connecting the first arm lower portion to the buck lever, second linkage means for pivotally connecting the lever to the second clamp head lower portion, third linkage means for pivotally connecting the first clamp head to the second arm lower portion and fourth linkage means for pivotally connecting the lever to the second arm, said linkage means being connected respectively to the lever, the clamp heads and the arms in spaced relationship for moving the clamp heads lower portions in opposite directions about equal amounts as the buck lever is pivoted.

36. The apparatus of claim 32 further characterized in that the first means includes a buck base, that there is provided a collar-shoulder form assembly, fourth means for mounting the collar-shoulder form assembly on the buck heads for limited vertical movement relative the buck heads to extend thereabove and outwardly of the buck heads in opposite directions lateral to the spacing of the buck heads, a pair of vertically elongated wings having a horizontal dimension in the direction of the spacing of the buck heads that is somewhat less than the spacing of the buck heads, fifth means mounted on the buck base for mounting the wings and moving the wings laterally in opposite directions between a retracted position adjacent the buck heads and an extended position substantially more remote of buck heads on opposite lateral sides of the buck heads and operable sixth means mounted in the base for resiliently urging the fourth means to elevate the collar-shoulder form assembly relative the buck heads and the fifth means to move the wings toward their extended position at about the same time the collar-shoulder form assembly is elevated.

37. The apparatus of claim 36 further characterized in that said collar-shoulder form assembly has laterally opposite end portions and that the fourth means includes a first and a second horizontal shaft, seventh means mounted on the buck heads for mounting said shafts in parallel, lateral spaced relationship, a first curved plate having one end joined to the collar-shoulder form assembly one end portion and an opposite, downwardly opening U-shaped portion mounted on said first shaft, means mounted on the first plate for cooperating with the first plate U-shaped portion for releasably retaining the first plate U-shaped portion on said first shaft, and a second curved plate having one end portion joined to the collar-shoulder form assembly other end portion and an opposite U-shaped end portion on the second shaft that opens laterally outwardly of the second shaft in a direction opposite the spacing of the first shaft from the second shaft.

38. The apparatus of claim 36 further characterized in that there is provided a frame, seventh means mounted on the frame for mounting the buck base for rotation about a vertical axis between a buck head first garment dressing position and a buck head finishing second position remote from the garment dressing position and power means mounted on the frame adjacent the garment dressing position for operating said sixth means to move the fourth means to move the collar-shoulder form assembly to a position lower than its elevated position and the wings to their retracted position when the buck base is at the garment dressing position and the third means to move the arms and the clamp heads lower portions to move the clamp heads to their open positions.

39. The apparatus of claim 38 further characterized in that there is provided operable means for selectively discharging hot air adjacent the finishing position and into the garment on the buck heads when the base is in the buck head second position, power means mounted on the frame for moving the buck base to rotate between its positions, and control means to operate the discharge means to discontinue the discharge of hot air adjacent the finishing position prior to and during the time the base is being rotated and to actuate the power means to rotate the base only when the wings are in their extended position and the collar-shoulder form assembly is in its elevated position.

40. The apparatus of claim 38 further characterized in that means is mounted on the frame for discharging fluid in an upward direction adjacent the buck assembly second position, and that duct means is mounted on the base to rotate therewith for directing fluid discharged from said fluid discharge means to flow upwardly into a garment dressed on the buck assembly in the space between the wings and buck heads when the buck base is in its second position.

41. The apparatus of claim 36 further characterized in that said collar-shoulder form assembly has laterally opposite end portions and that the fourth means includes a pair of laterally elongated cross bars each having a first end portion and a second end portion, means for mounting said cross bars in parallel relationship, a first pivot member mounted by the cross bar first end portions, a second pivot member mounted by the cross bar second end portions, first link means having an intermediate portion pivotally mounted by the first pivot member, a first end portion and a second end portion, second link means having an intermediate portion pivotally mounted by the second pivot member, a first end portion and a second end portion, eighth means movably connected to the link means first end portions for retaining the link means first end portions adjacent one another and moving the first and second link means about the respective pivot members in opposite angular directions, means for mounting the collar-shoulder form assembly one end portion on the first link means second end portion and means for mounting the collar-shoulder form assembly other end portion on the second link means second end portion.

42. The apparatus of claim 41 further characterized in that the sixth means includes a vertically elongated rod vertically reciprocally mounted on the buck heads that has an upper end portion secured to the eighth means to move the eighth means as the rod is moved to pivot the link means about their respective pivot member and means secured to the rod to move therewith for moving the fifth means to retract the wings as the rod is moved upwardly.

43. In garment finishing apparatus, a buck assembly having a collar-shoulder form assembly, a pair of buck heads having upper end portions and first means for mounting the collar-shoulder form assembly on the upper end portions of the buck heads, said first means including a first and a second horizontal shaft, second means mounted on the buck heads for mounting said shafts in parallel, lateral spaced relationship, a first curved plate having one end joined to the collar-shoulder form assembly one end portion and an opposite, downwardly opening U-shaped portion mounted on said first shaft, means mounted on the first plate for cooperating with the first plate U-shaped portion for releasably retaining the first plate U-shaped portion on said first shaft, and a second curved plate having one end portion joined to the collar-shoulder form assembly other end portion and an opposite U-shaped end portion on the second shaft that opens laterally outwardly of the second shaft in a direction opposite the spacing of the first shaft from the second shaft.

44. The apparatus of claim 43 further characterized in that said collar-shoulder form assembly has laterally opposite end portions and that the second means includes a pair of laterally elongated cross bars each having a first end portion and a second end portion, means for mounting said cross bars in parallel relationship on the buck head upper end portions, a first pivot member mounted by the cross bar first end portions, a second pivot member mounted by the cross bar second end portions, first link means having an intermediate portion pivotally mounted by the first pivot member, a first end portion and a second end portion mounting the first shaft, second link means having an intermediate portion pivotally mounted by the second pivot member, a first end portion and a second end portion mounting the second shaft, and third means movably connected to the link means first end portions for retaining the link means first end portions adjacent one another and moving the first and second link means about the respective pivot members in opposite angular directions.

45. The apparatus of claim 44 further characterized in that the buck assembly includes a pair of wings and operable fourth means connected to the buck heads for mounting the wings and moving the wings in opposite lateral directions relative the buck heads between a retracted position and an extended position more laterally remote from the buck heads, said fourth means including a vertically elongated rod vertically reciprocally mounted on the buck heads that has an upper end portion secured to the third means to move the third means as the rod is moved upwardly to pivot the link means about their respective pivot members in a direction to move the collar-shoulder form assembly from an elevated position relative the buck heads to a lower position and means connected to the rod to move therewith for, as the rod is moved upwardly, moving the fourth means to move the wings toward their retracted positions.

References Cited

UNITED STATES PATENTS

| | | | |
|---|---|---|---|
| 2,966,288 | 12/1960 | Nancarrou | 223—57 |
| 3,384,347 | 5/1968 | Lornitzo | 223—57 |
| 3,198,407 | 8/1965 | Hughes | 223—57 |

MERVIN STEIN, Primary Examiner

GEORGE V. LARKIN, Assistant Examiner